(12) United States Patent
Yoshikawa et al.

(10) Patent No.: US 10,047,658 B2
(45) Date of Patent: Aug. 14, 2018

(54) EXHAUST GAS TEMPERATURE CONTROL APPARATUS AND EXHAUST GAS TEMPERATURE ADJUSTMENT APPARATUS

(71) Applicant: NGK SPARK PLUG CO., LTD., Nagoya-shi, Aichi (JP)

(72) Inventors: Takaya Yoshikawa, Kasugai (JP); Kentaro Mori, Nagoya (JP); Hiroyuki Suzuki, Kasugai (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 15/047,738

(22) Filed: Feb. 19, 2016

(65) Prior Publication Data
US 2016/0251993 A1    Sep. 1, 2016

(30) Foreign Application Priority Data

Feb. 26, 2015    (JP) ................................. 2015-036509

(51) Int. Cl.
| | |
|---|---|
| *F01N 3/00* | (2006.01) |
| *F01N 9/00* | (2006.01) |
| *F01N 3/023* | (2006.01) |
| *F01N 3/027* | (2006.01) |

(Continued)

(52) U.S. Cl.
CPC ............ *F01N 9/002* (2013.01); *F01N 3/021* (2013.01); *F01N 3/027* (2013.01); *F01N 3/0234* (2013.01); *F01N 3/2066* (2013.01); *F01N 9/00* (2013.01); *F01N 2240/10* (2013.01); *F01N 2900/1404* (2013.01); *Y02A 50/2325* (2018.01); *Y02T 10/24* (2013.01); *Y02T 10/47* (2013.01)

(58) Field of Classification Search
CPC .... F01N 3/027; F01N 3/0234; F01N 2410/00; F01N 3/0878; F01N 2240/10; F01N 2900/1404; F01N 9/00; F01N 9/002
USPC ..................................................... 60/295, 303
See application file for complete search history.

(56) References Cited

U.S. PATENT DOCUMENTS

| | | | | |
|---|---|---|---|---|
| 4,450,682 A | * | 5/1984 | Sato ...................... | F01N 3/0211 55/283 |
| 8,151,557 B2 | * | 4/2012 | Gonze .................... | F01N 3/027 60/274 |

(Continued)

FOREIGN PATENT DOCUMENTS

| | | |
|---|---|---|
| JP | 2008-190462 A | 8/2008 |
| JP | 2010-261423 A | 11/2010 |

*Primary Examiner* — Mark Laurenzi
*Assistant Examiner* — Anthony Ayala Delgado
(74) *Attorney, Agent, or Firm* — Stites & Harbison, PLLC; Jeffrey A. Haeberlin

(57) ABSTRACT

An exhaust gas temperature control apparatus adjusts the temperature of exhaust gas in a stage before an exhaust gas purification unit disposed in an exhaust pipe passage of an internal combustion engine. The exhaust gas temperature control apparatus includes a heat reservoir which can store and radiate heat, a heating member which causes the heat reservoir to store heat, and a temperature control section which controls the temperature of the exhaust gas discharged from the exhaust gas temperature control apparatus by causing the heat reservoir to store heat or radiate heat in accordance with operation state of a vehicle on which the internal combustion engine is mounted.

9 Claims, 14 Drawing Sheets

(51) Int. Cl.
*F01N 3/20* (2006.01)
*F01N 3/021* (2006.01)

(56) References Cited

U.S. PATENT DOCUMENTS

| | | | |
|---|---|---|---|
| 8,562,924 B1* | 10/2013 | Roberts, Jr. | F01N 3/0231 423/213.2 |
| 9,139,105 B2* | 9/2015 | Kim | B60L 15/2009 |
| 2002/0194842 A1* | 12/2002 | Minami | B01D 53/9477 60/288 |

* cited by examiner

EXHAUST GAS TEMPERATURE CONTROL APPARATUS AND EXHAUST GAS TEMPERATURE ADJUSTMENT APPARATUS

CROSS REFERENCE TO RELATED APPLICATION

The present application claims priority to Japanese Patent Application No. 2015-036509, which was filed on Feb. 26, 2015, the disclosure of which is herein incorporated by reference in its entirety.

BACKGROUND OF THE INVENTION

Field of the Invention

The present invention relates to an exhaust gas temperature control apparatus which is disposed in an exhaust pipe passage of an internal combustion engine and controls the temperature of exhaust gas, and to an exhaust gas temperature adjustment apparatus disposed in the exhaust pipe passage.

Description of Related Art

In order to cope with recent regulations on the components of emission gas (exhaust gas) of an internal combustion engine, various types of exhaust gas purification units are disposed in the exhaust pipe passage of the internal combustion engine. These exhaust gas purification units purify the exhaust gas components such as NOx and PM (particulate matter) through chemical reaction between a chemical substance such as catalyst or urea water and the exhaust gas components, and the chemical substance exhibits an optimum purification performance in a certain temperature range. Meanwhile, as a result of the improved combustion efficiency of the internal combustion engine, the temperature of exhaust gas tends to decrease. In view of this, there has been proposed a technique of controlling the bed temperature of a selective reduction catalyst in a subsequent stage to a temperature range in which the NOx purification rate is relatively high. Specifically, a passage containing a heat reservoir and a passage for bypassing the heat reservoir are added to the exhaust pipe passage so as to adjust the temperature of exhaust gas to thereby control the bed temperature of the selective reduction catalyst to the temperature range in which the NOx purification rate is relatively high (see, for example, Patent Document 1).

RELATED ART DOCUMENT

Patent Document 1 is Japanese Patent Application Laid-Open (kokai) No. 2010-261423.

BRIEF SUMMARY OF THE INVENTION

However, the technique using a heat reservoir only has a problem in that when the temperature of the heat reservoir itself is low, bringing exhaust gas into contact with the heat reservoir rather lowers the temperature of exhaust gas or the temperature of exhaust gas cannot be raised to a desired temperature. Also, in the case where the exhaust gas temperature is raised using a heating apparatus, there arises a problem in that the supply of electric power to the heating apparatus increases the load of a vehicle during travel, whereby the fuel efficiency of the vehicle decreases.

Accordingly, there has been desire to adjust the temperature of exhaust gas discharged from an internal combustion engine to an operating temperature range of a purification unit, while suppressing a decrease in the overall energy efficiency of a vehicle, irrespective of the temperature of the exhaust gas.

The present invention has been accomplished so as to solve the above-described problem and can be realized as the following modes.

A first mode provides an exhaust gas temperature control apparatus which adjusts the temperature of exhaust gas in a stage before an exhaust gas purification unit disposed in an exhaust pipe passage of an internal combustion engine. The exhaust gas temperature control apparatus according to the first mode comprises a heat reservoir configured to store and radiate heat; a heating member configured to cause the heat reservoir to store heat; and a temperature control section configured to control the temperature of the exhaust gas discharged from the exhaust gas temperature control apparatus by causing the heat reservoir to store heat or radiate heat in accordance with operation state of a vehicle on which the internal combustion engine is mounted.

The exhaust gas temperature control apparatus according to the first mode can adjust the temperature of exhaust gas discharged from the internal combustion engine to the operating temperature range of the purification unit, while suppressing a decrease in the overall energy efficiency of the vehicle, irrespective of the temperature of the exhaust gas.

In the exhaust gas temperature control apparatus according to the first mode, the heating member may generate heat using regenerative electric power obtained depending on the operation state of the vehicle. That is to say, the regenerative power is obtained depending on the operative state of the vehicle, and the heating member generates heat using the regenerative electric power. In this case, it is possible to adjust the exhaust gas temperature to the operating temperature range of the purification unit by causing the heating member to generate heat, without lowering the overall energy efficiency of the vehicle.

The exhaust gas temperature control apparatus according to the first mode may further comprise a first flow passage for the exhaust gas (i.e., the first flow passage serves as a flow passage for the exhaust gas), the first flow passage containing the heat reservoir; a second flow passage for the exhaust gas (i.e., the second flow passage serves as a flow passage for the exhaust gas) which differs from the first flow passage; and a changeover section which leads the exhaust gas to at least one of the first flow passage and the second flow passage (i.e., the changeover section switches the flow passage for the exhaust gas to at least one of the first flow passage and the second flow passage), wherein the temperature control section causes the heat reservoir to store heat or radiate heat by controlling the changeover section. In this case, it is possible to cause the heat reservoir to store heat or radiate heat by switching the exhaust gas flow passage between the flow passage in which the heat reservoir is disposed and the flow passage in which the heat reservoir is not disposed.

In the exhaust gas temperature control apparatus according to the first mode, the temperature control section may switch the changeover section to lead the exhaust gas to the first flow passage when either: (1) the temperature of the exhaust gas is equal to or higher than a first predetermined temperature and the temperature of the heat reservoir is lower than a second predetermined temperature lower than the first predetermined temperature, or (2) when the temperature of the exhaust gas is lower than a third predetermined temperature lower than the first predetermined temperature and the temperature of the heat reservoir is equal to or higher than a fourth predetermined temperature higher than the second predetermined temperature and the third predetermined temperature. In this case, the temperature of the exhaust gas discharged from the exhaust gas temperature control apparatus can be controlled by storing heat in the heat reservoir using the exhaust gas or raising the temperature of the exhaust gas using the heat reservoir.

In the exhaust gas temperature control apparatus according to the first mode, the temperature control section may switch the changeover section to lead the exhaust gas to the second flow passage when the temperature of the exhaust gas is lower than the first predetermined temperature and is equal to or higher than the third predetermined temperature. In this case, it is possible to control the temperature of the exhaust gas discharged from the exhaust gas temperature control apparatus without through the heat reservoir to a temperature within a predetermined temperature range.

In the exhaust gas temperature control apparatus according to the first mode, the temperature control section may switch the changeover section to lead the exhaust gas to the second flow passage when the operation state of the vehicle is a deceleration state, a cold start state, or a steady state. In this case, it becomes possible to discharge the exhaust gas without through the heat reservoir.

In the exhaust gas temperature control apparatus according to the first mode, the temperature control section may supply obtained regenerative electric power to the heating member when the operation state of the vehicle is a deceleration state. In this case, it is possible to cause the heating member to generate heat and store the generated heat in the heat reservoir without lowering the overall energy efficiency of the vehicle, and adjust the exhaust gas temperature to the operating temperature range of the purification unit when necessary through use of the stored heat.

In the exhaust gas temperature control apparatus according to the first mode, the temperature control section may switch the changeover section to lead the exhaust gas to the first flow passage when the operation state of the vehicle is an acceleration state or is a high load state in which a load greater than a predetermined load acts on the vehicle. In this case, the exhaust gas temperature can be lowered by the heat reservoir.

A second mode provides an exhaust gas temperature adjustment apparatus disposed in an exhaust pipe passage of an internal combustion engine. The exhaust gas temperature adjustment apparatus according to the second mode comprises an introduction opening for introducing exhaust gas from the internal combustion engine; a discharge opening for discharging the introduced exhaust gas; a first flow passage establishing communication between the introduction opening and the discharge opening; a heat reservoir and a heating member disposed in the first flow passage; a second flow passage which differs from the first flow passage, the second flow passage establishing communication between the introduction opening and the discharge opening; and a changeover section configured to lead the exhaust gas to at least one of the first flow passage and the second flow passage (i.e., the changeover section switches a flow passage, through which the exhaust gas flows, to at least one of the first flow passage and the second flow passage).

The exhaust gas temperature adjustment apparatus according to the second mode can adjust the temperature of exhaust gas discharged from the internal combustion engine to the operating temperature range of the purification unit, while suppressing a decrease in the overall energy efficiency of the vehicle, irrespective of the temperature of the exhaust gas.

In the exhaust gas temperature adjustment apparatus according to the second mode, the heating member and the heat reservoir may be integrally formed. In this case, the efficiency of the operation of storing heat in the heat reservoir using the heating member can be improved.

The exhaust gas temperature adjustment apparatus according to the second mode may further comprise a second heating member disposed at the discharge opening. In this case, the shortage of heat which occurs as a result of heating the exhaust gas by the heat reservoir only can be supplemented by the heat generated by the second heating member.

The exhaust gas temperature adjustment apparatus according to the second mode may further comprises a selective catalytic reduction unit disposed in the first flow passage and located downstream of the heat reservoir and the heating member. In this case, it is possible to efficiently raise the temperature of the selective catalytic reduction unit to a proper operating temperature.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE INVENTION

Figure 1:
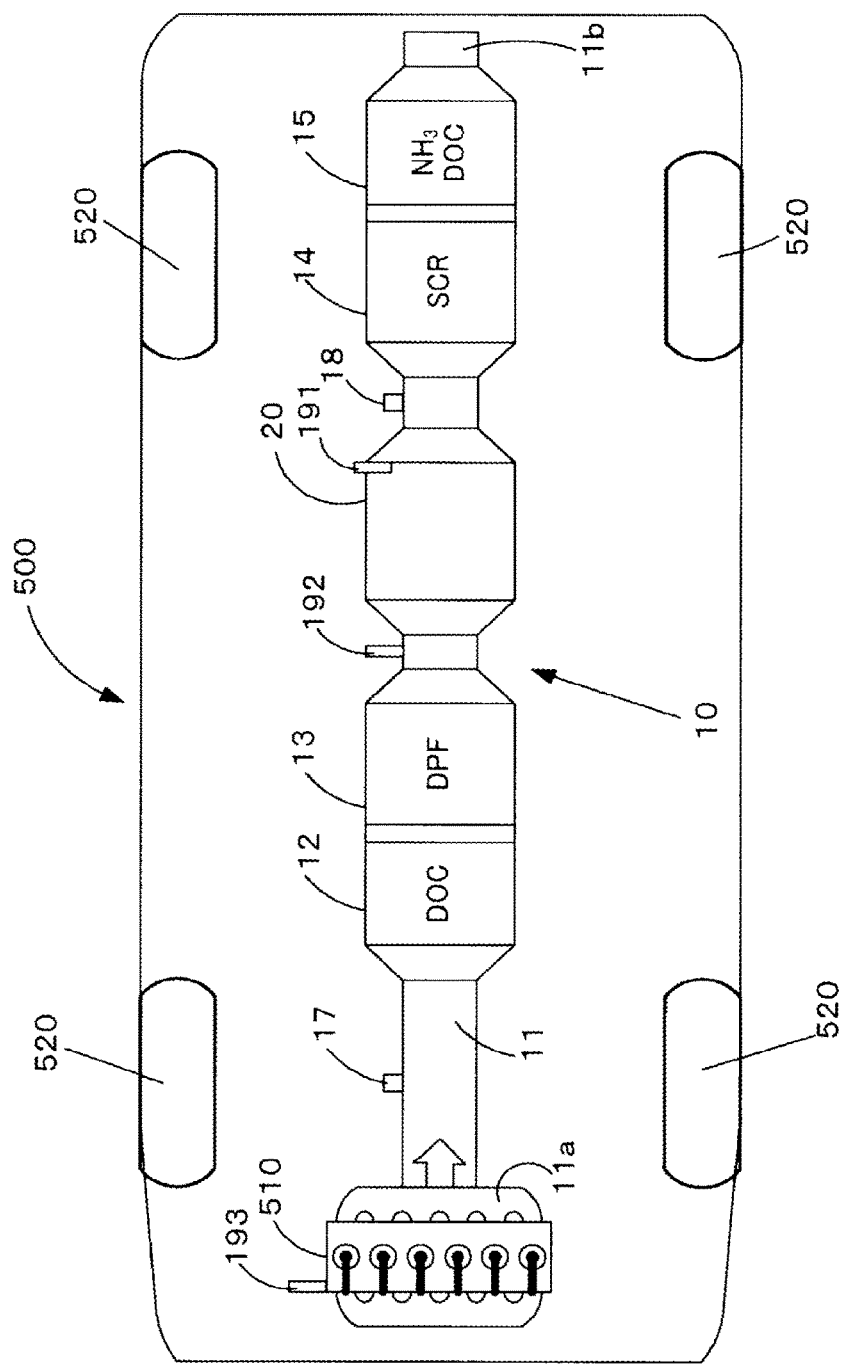
FIG. 1 is an explanatory view schematically showing a vehicle including an exhaust gas temperature control apparatus used in a first embodiment.

One mode of an exhaust gas temperature control apparatus according to the present invention will now be described by taking as an example a vehicle including a diesel engine (internal combustion engine). FIG. 1 is an explanatory view schematically showing a vehicle having an exhaust gas temperature control apparatus used in a first embodiment.

A. First Embodiment

A vehicle 500 includes a diesel engine (hereafter referred to as the "engine") 510, four wheels 520, and an exhaust gas purification system 10. The engine 510 uses light oil as fuel and outputs drive force by means of explosive combustion of the fuel. Also, as a result of the explosive combustion, the engine 510 discharges exhaust gas containing NOx (nitrogen oxides) and PM (particulate matter) to the atmosphere through the purification system 10 provided in the exhaust system of the vehicle 500. Notably, the configuration of the vehicle shown in FIG. 1 and used in the first embodiment can be used similarly in other embodiments.

The purification system 10 includes various types of exhaust gas purification units provided on an exhaust pipe (exhaust pipe passage). The exhaust pipe 11 is connected to the engine 510 through a manifold 11a on the side toward the engine 510 (on the upstream side with respect to the flow direction of the exhaust gas), and has a muffler end pipe 11b on the furthest downstream side with respect to the flow direction of the exhaust gas. A third temperature sensor 193 for detecting the temperature of coolant is provided on the engine 510. The purification system 10 includes a diesel oxidation catalyst (DOC) 12, a diesel particulate filter (DPF) 13, an exhaust gas temperature control apparatus 20, a selective catalytic reduction (SCR) unit 14, and an ammonia slip diesel oxidation catalyst ($NH_3$ DOC) 15 which are provided on the exhaust pipe 11 in this order from the upstream side with respect to the flow direction of the exhaust gas. A fuel injection unit 17 may be disposed on the exhaust pipe 11 to be located upstream of the DOC 12, and a urea water injection unit 18 is disposed upstream of the SCR unit 14. A first temperature sensor 191 is disposed on the exhaust gas temperature control apparatus 20, and a second temperature sensor 192 is disposed upstream of the exhaust gas temperature control apparatus 20. The first temperature sensor 191 may be disposed on the upstream side or downstream side of the exhaust gas temperature control apparatus 20. The second temperature sensor 192 may be disposed at any location where it can detect the temperature of the exhaust gas introduced into the exhaust gas temperature control apparatus 20, for example, on the downstream side (outlet side) of the DPF 13. Notably, the expression "on the exhaust pipe" in the present embodiment encompasses both the case where a relevant unit or the like is provided inside the exhaust pipe and in the case where a relevant unit or the like is provided in the midway of the exhaust pipe (a relevant unit or the like constitutes a portion of the exhaust pipe).

The diesel oxidation catalyst 12 carries a noble metal such as platinum (Pt), palladium (Pd), or the like as a catalyst. The diesel oxidation catalyst 12 oxidizes carbon monoxide (CO) and hydrocarbon (HC) which are unburned gas components contained in the exhaust gas and convert them to carbon dioxide ($CO_2$) and water ($H_2O$), and oxides nitrogen monoxide (NO) contained in the exhaust gas and coverts it to nitrogen dioxide ($NO_2$).

The diesel particulate filter 13 is a filter which collects the particulate matter (PM) contained in the exhaust gas by fine voids of a porous ceramic. A metal catalyst such as platinum or the like is applied to the surface of the porous ceramic. The diesel particulate filter 13 is naturally regenerated as follows. In the presence of $NO_2$ produced by the diesel oxidation catalyst 12, the particulate matter chemically reacts with the catalyst in an atmosphere of 250 to 300° C. and is converted to carbon dioxide ($CO_2$) and water ($H_2O$), whereby the diesel particulate filter 13 is regenerated. The diesel particulate filter 13 can be regenerated by means of forced regeneration as well. Specifically, fuel is supplied to the diesel oxidation catalyst 12 directly through the fuel injection unit 17 or indirectly from the engine 510 in the exhaust stroke, and hydrocarbon originating from the fuel is catalytically combusted so as to increase the temperature of the exhaust gas to 450° C. or higher, whereby the collected particulate mater is oxidized. Thus, the diesel particulate filter 13 is regenerated.

The selective catalytic reduction (SCR) unit 14 is an apparatus which carries a zeolite-based catalyst or a vanadium-based catalyst and selectively reduces NOx. In general, the selective catalytic reduction unit 14 operates as follows. Urea water is sprayed on the exhaust gas by the urea water injection unit 18 at a location before the inlet of the selective catalytic reduction unit 14. The selective catalytic reduction unit 14 produces ammonia ($NH_3$) through thermal decomposition of the urea water and hydrolysis reaction, and convers the NOx component of the exhaust gas to nitrogen ($N_2$) and water ($H_2O$). Accordingly, at the location before the inlet of the selective catalytic reduction unit 14, the exhaust gas must have a proper temperature (for example, 200° C. or higher) in order to obtain ammonia from the urea water.

The ammonia slip diesel oxidation catalyst 15 carries the same catalyst as the diesel oxidation catalyst 12. The ammonia slip diesel oxidation catalyst 15 oxidizes and decomposes ammonia not used for the reaction at the selective catalytic reduction unit 14 to thereby produce nitrogen or NOx.

Figure 2:
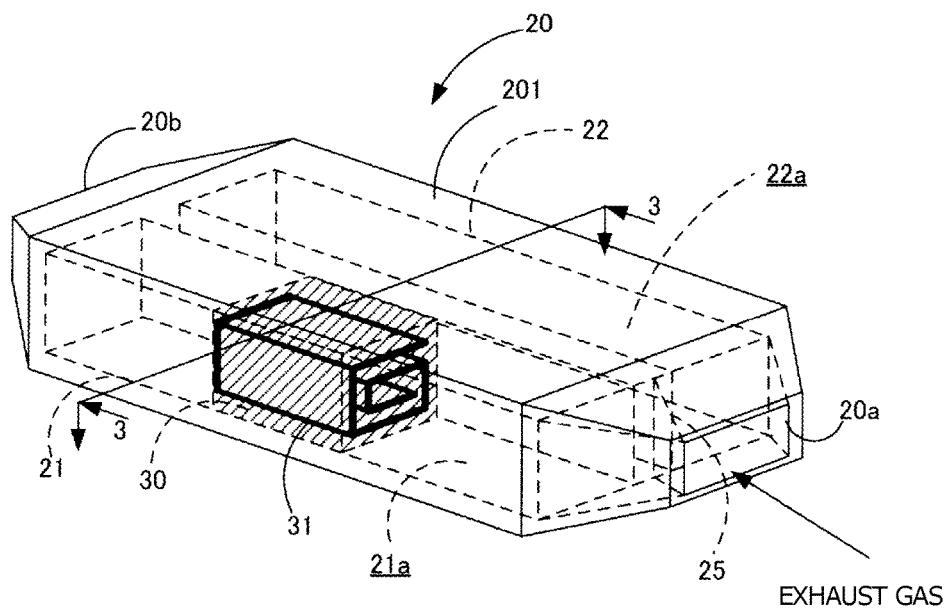
FIG. 2 is an external perspective view schematically showing the structure of the exhaust gas temperature control apparatus according to the first embodiment.
Figure 3:
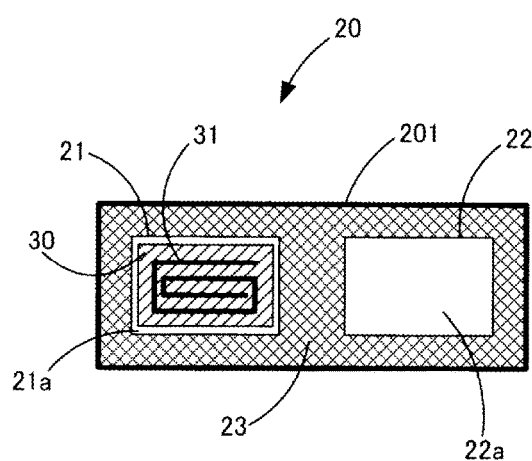
FIG. 3 is a schematic transverse cross-sectional view of the exhaust gas temperature control apparatus according to the first embodiment taken along line 3-3 shown in FIG. 2.

The exhaust gas temperature control apparatus 20 according to the present embodiment will now be described in detail. FIG. 2 is an external perspective view schematically showing the structure of the exhaust gas temperature control apparatus according to the first embodiment. FIG. 3 is a schematic transverse cross-sectional view of the exhaust gas temperature control apparatus according to the first embodiment taken along line 3-3 shown in FIG. 2.

The exhaust gas temperature control apparatus 20 includes a casing 201 (housing), a first flow passage pipe 21, a second flow passage pipe 22, a heat reservoir 30, a heating member 31, a heat insulating material 23, and a flow passage changeover valve 25. Notably, in the case where the exhaust gas temperature control apparatus 20 does not contain a control unit 60 to be described later, the exhaust gas temperature control apparatus 20 may be referred to as an exhaust gas temperature adjustment apparatus. The casing 201 is formed of stainless steel or steel sheet with oxidation prevention treatment performed thereon. The first flow passage pipe 21 defines a first flow passage 21a through which the exhaust gas flows, and the second flow passage pipe 22 defines a second flow passage 22a through which the exhaust gas flows. The first flow passage pipe 21 and the second flow passage pipe 22 are disposed in parallel to each other. The casing 201 has an introduction opening 20a for introducing the exhaust gas into the inside of the casing 201 and a discharge opening 20b for discharging the exhaust gas to the outside. The introduction opening 20a communicates with the first flow passage pipe 21 and the second flow passage pipe 22, and the discharge opening 20b communicates with the first flow passage pipe 21 and the second flow passage pipe 22. Although the first flow passage pipe 21 and the second flow passage pipe 22 have the shape of a hollow parallelepiped, they may have a cylindrical shape or any other shape.

On one side of the casing 201 where the introduction opening 20a is provided, the flow passage changeover valve 25 is provided so as to switch the flow passage pipe through which the exhaust gas flows, between the first flow passage pipe 21 and the second flow passage pipe 22. The flow passage changeover valve 25 may be a changeover valve in which selective switching between the flow passages is realized by swing motion of a plate-shaped valve body about a shaft provided at one end of the valve body as shown in the drawings, a changeover valve in which selective switching between the flow passages is realized by rotation of a rotary valve body about its axis, the rotary valve body having communication passages formed therein, or a changeover valve in which selective switching between the flow passages is realized by straight movement of a plate-shaped valve body. Examples of an actuator for driving the valve body include a motor such as a stepping motor, an electromagnetic actuator, and an actuator using fluid such as air or oil. Notably, as will be described later, there exist cases where the switching between the flow passages is not required to be selective; i.e., exclusive. In such a case, the flow passage changeover valve 25 is required to introduce the exhaust gas, introduced through the introduction opening 20a, to both of the first and second flow passage pipes 21 and 22. The flow passage changeover valve 25 may be provided for each of the flow passage pipes 21 and 22. In this case, it is possible to close one flow passage pipe and adjust the flow rate of the exhaust gas flowing to the other flow passage pipe. Namely, the exhaust gas flow rates at the two flow passage pipes can be controlled independently.

The heat reservoir 30 is disposed inside the first flow passage pipe 21 to partially occupy the interior of the flow passage pipe 21. Although the heat reservoir 30 has a rectangular parallelepipedic shape corresponding to the shape of the first flow passage pipe 21, the heat reservoir 30 may have a circular columnar shape or any other shape. The heat reservoir 30 may be any of a ceramic member, a sintered body of metal powder, a metal honeycomb, an expanded metal, and the like each of which has internal flow passages through which the exhaust gas can flow. Also, a latent heat reservoir formed of molten salt or the like may be used as the heat reservoir 30. Notably, the internal flow passages may be intentionally formed flow passages (for example, straight flow passages) or flow passages (for example, meandering flow passages) formed by voids formed due to the property of the material. Notably, depending on the required heat capacity, the heat reservoir 30 may be disposed in the first flow passage pipe 21 such that the heat reservoir 30 occupies the entire internal space of the first flow passage pipe 21.

The heating member (heater) 31 is embedded in the heat reservoir 30. In the example shown in FIGS. 2 and 3, since the first flow passage pipe 21 has a rectangular parallelepipedic shape and the heat reservoir 30 also has a parallelepipedic shape corresponding thereto, the heating member 31 has a rectangular spiral cross-sectional shape. However, the heating member 31 may have a circular spiral cross-sectional shape. Since the heating member 31 is used to store heat in the heat reservoir 30, the heating member 31 may be partially or entirely embedded in the heat reservoir 30, or may be disposed near or joined to a portion or the entirety of the outer peripheral surface of the heat reservoir 30. The heating member 31 may be a heating member which is formed by stacking a plurality of flat or corrugated metal plates, or flat and corrugated metal plates, in such a manner that they are spaced from one another and in which the plates themselves generate heat upon energization. In this case, it is desired that holes be formed in the metal plates or irregularities be formed on the metal plates in order to increase their heat generation surface areas. A plurality of heating members each of which has a rod-like shape and which are inserted into the internal flow passages of the heat reservoir 30 to extend along the flow direction of the exhaust gas may be used as the heating member 31. Notably, the heating member in the present embodiment may be a resistance heating element (heat generation member) whose periphery is not covered with an insulating material and which itself generates heat when electricity is supplied thereto. For example, the heating member may be a wire-shaped heating member such as Nichrome wire, copper wire, or tungsten wire. Alternatively, the heating member 31 may be a plate-shaped bare metallic member formed of, for example, stainless steel, cupper, or aluminum. Alternatively, the heating member 31 may be formed of non-metallic material (e.g., silicon carbide, carbon, etc.) which is small in heat capacity and does not function as a heat reservoir. Alternatively, the heating member 31 may be a heating member which includes a resistance heating element disposed within a casing and covered with powder of an inorganic insulating material such as magnesia; i.e., the heating member 31 may be a heating member generally called "heater."

Notably, in the case where the heating member 31 is formed by stacked plates and has a spiral cross section, the heating member 31 may be used as the heat reservoir 30. Namely, since each metal plate can function as a heat generation member and a heat storage member, the heating member 31 can function as a heat reservoir 30 having a predetermined heat capacity. In this case, the separating spaces between the stacked plates can function as internal flow passages. Further, the heating member 31 is not required to be embedded in the heat reservoir 30 and may be disposed on the upstream side (the engine side) or the downstream side of the heat reservoir 30 to be located near the heat reservoir 30. Namely, no limitation is imposed on the position of the heating member 31 so long as the heating member 31 can heat the heat reservoir 30 and causes the heat reservoir 30 to store heat.

The heat insulating material 23 is disposed or charged in the space between the casing 201 and the first flow passage pipe 21 and the second flow passage pipe 22. For example, a sheet material formed of ceramic, a cylindrical hard ceramic material, or a foamable ceramic material is used as the heat insulating material 23. As a result of provision of the heat insulating material 23, the amount of heat conducted to the metallic casing 201 can be reduced, and the heat insulating efficiency of the exhaust gas temperature control apparatus 20 can be maintained at a desired level. Notably, in order to further improve the heat insulation property, the casing 201 may have a double wall structure in which a layer of air is provided between the two walls.

Figure 4:
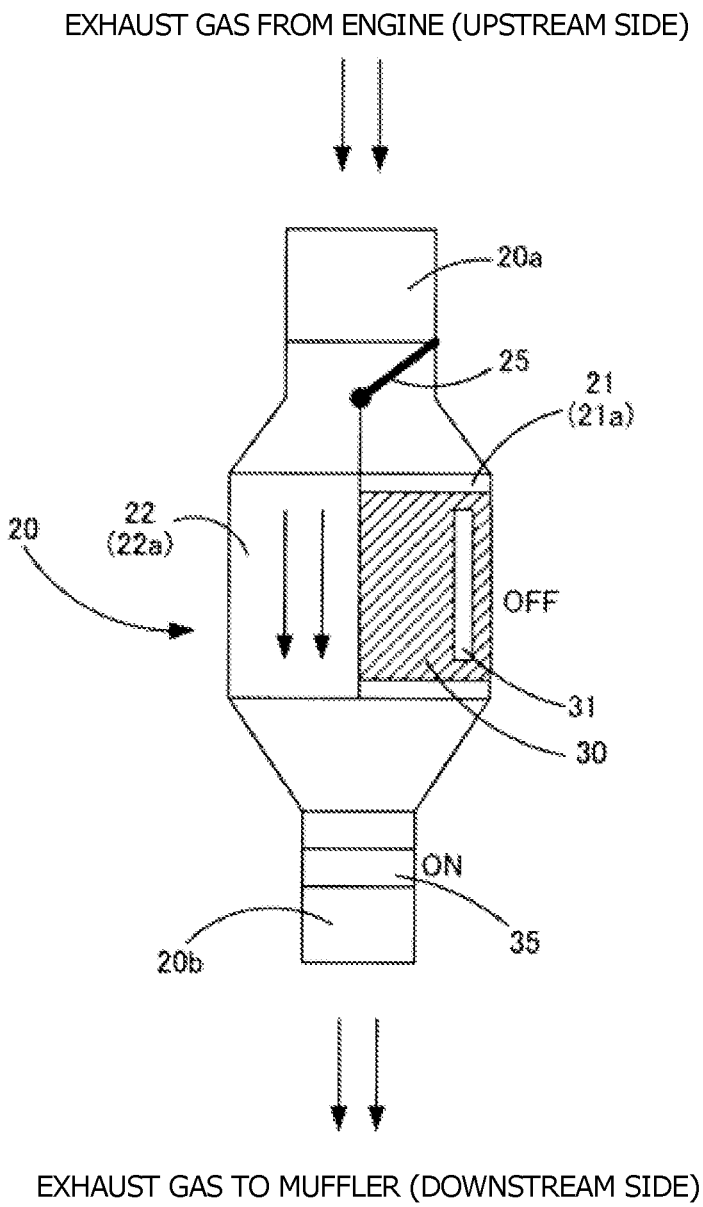
FIG. 4 is an explanatory view showing an operating state of the exhaust gas temperature control apparatus according to the first embodiment at the time of cold start.
Figure 5:
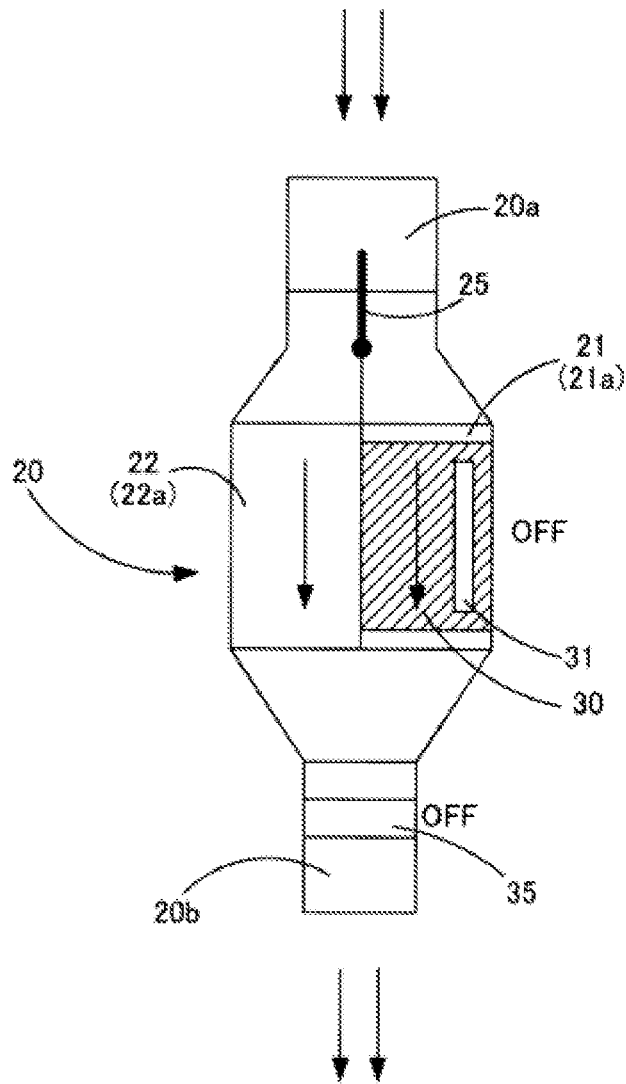
FIG. 5 is an explanatory view showing an operating state of the exhaust gas temperature control apparatus according to the first embodiment at the time of steady operation.
Figure 6:
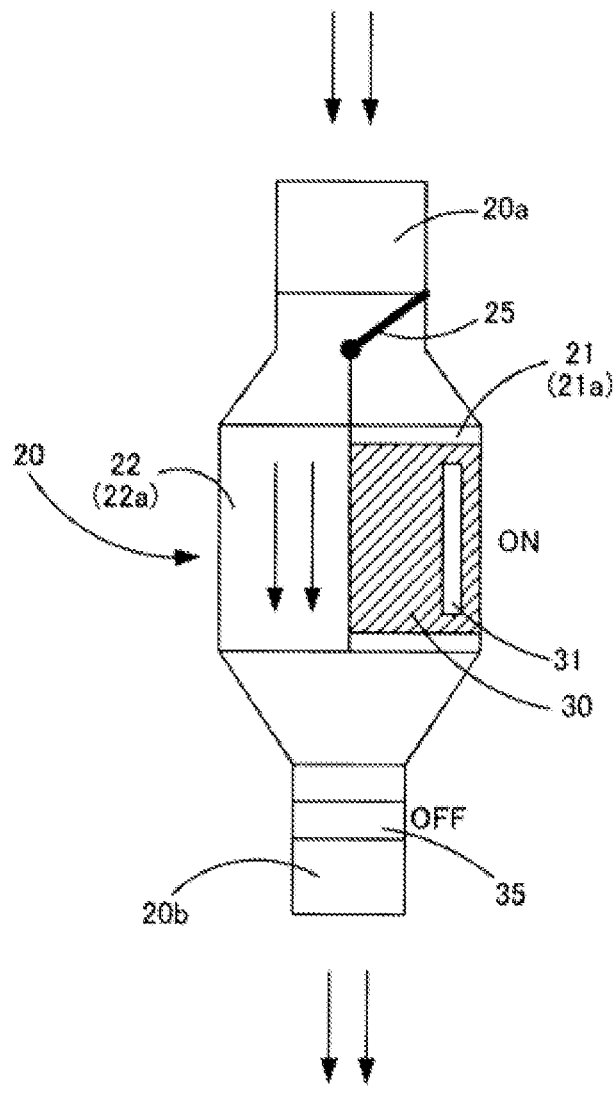
FIG. 6 is an explanatory view showing an operating state of the exhaust gas temperature control apparatus according to the first embodiment at the time of deceleration and at the time of low load.
Figure 7:
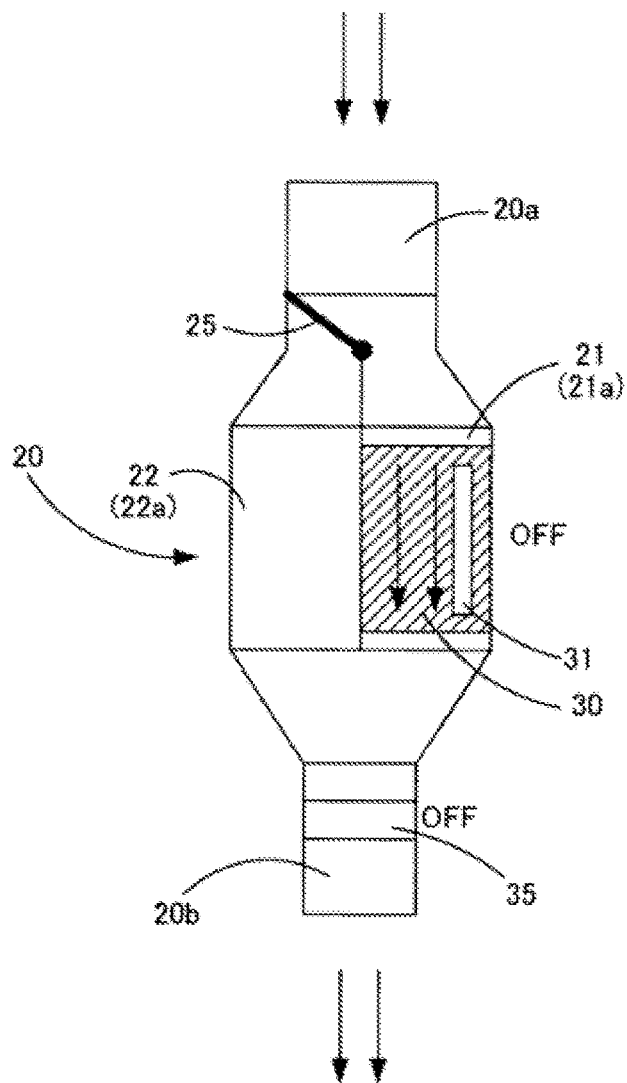
FIG. 7 is an explanatory view showing an operating state of the exhaust gas temperature control apparatus according to the first embodiment at the time of acceleration.
Figure 8:
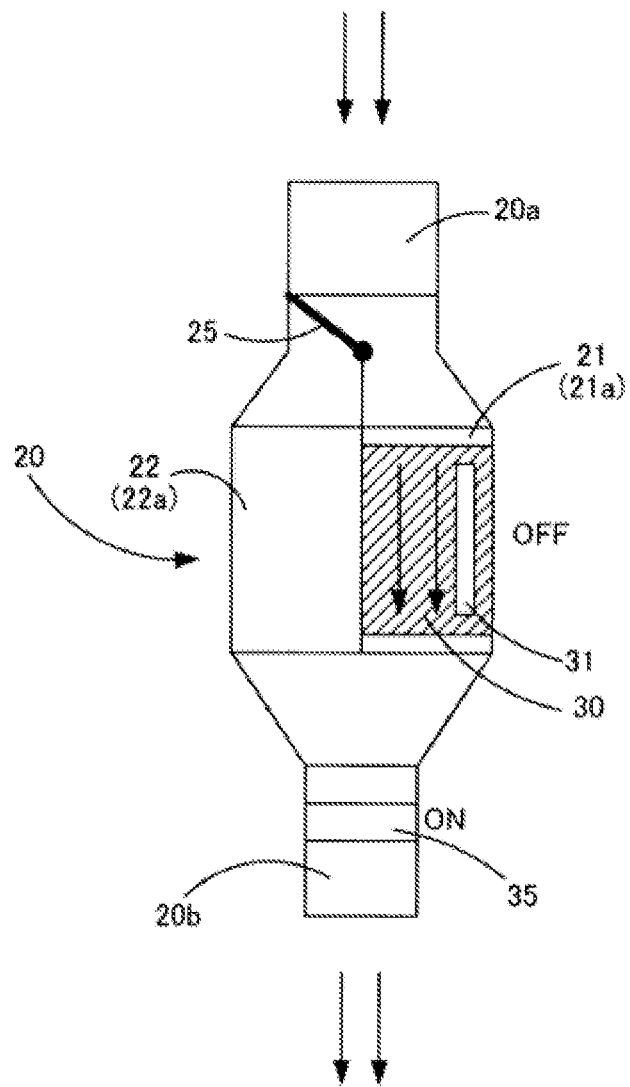
FIG. 8 is an explanatory view showing an operating state of the exhaust gas temperature control apparatus according to the first embodiment at the time of rapid acceleration or at the time of acceleration in a state in which a heat reservoir has not yet stored a sufficient amount of heat.
Figure 9:
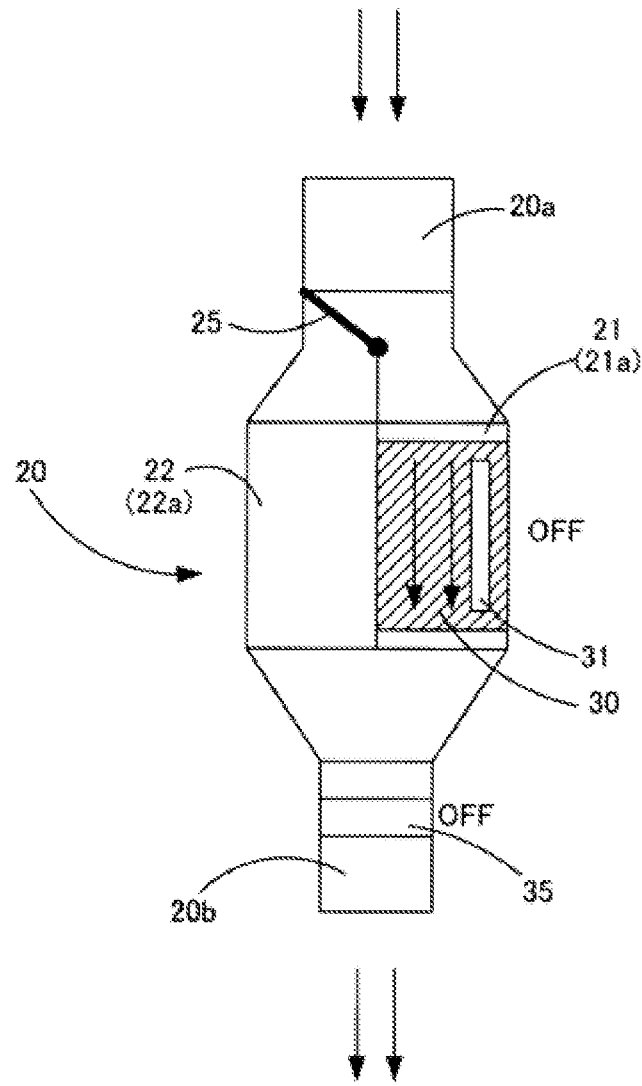
FIG. 9 is an explanatory view showing an operating state of the exhaust gas temperature control apparatus according to the first embodiment at the time of high load and at the time of regeneration of a DPF.

The switching of the flow passage changeover valve 25 in accordance with the operation state of the vehicle and the heating of the heat reservoir 30 by the heating member 31; namely, the operation of the exhaust gas temperature control apparatus according to the first embodiment, will be described with reference to FIGS. 4 to 9. FIG. 4 is an explanatory view showing an operating state of the exhaust gas temperature control apparatus according to the first embodiment at the time of cold start. FIG. 5 is an explanatory view showing an operating state of the exhaust gas temperature control apparatus according to the first embodiment at the time of steady operation. FIG. 6 is an explanatory view showing an operating state of the exhaust gas temperature control apparatus according to the first embodiment at the time of deceleration and at the time of low load. FIG. 7 is an explanatory view showing an operating state of the exhaust gas temperature control apparatus according to the first embodiment at the time of acceleration. FIG. 8 is an explanatory view showing an operating state of the exhaust gas temperature control apparatus according to the first embodiment at the time of rapid acceleration or at the time of acceleration in a state in which the heat reservoir has not yet stored a sufficient amount of heat. FIG. 9 is an explanatory view showing an operating state of the exhaust gas temperature control apparatus according to the first embodiment at the time of high load and at the time of regeneration of the DPF.

In the case where the operation state of the vehicle is the state of cold start, as shown in FIG. 4, the flow passage changeover valve 25 is switched so as to close the first flow passage pipe 21 and lead the exhaust gas from the engine 510 to the second flow passage pipe 22; i.e., the second flow passage 22a. This operation is performed for the following reason. At the time of cold start, the temperature of the exhaust gas is low (for example, about 50° C.). Therefore, when the heat reservoir 30 is exposed to the exhaust gas, the temperature (heat storage amount) of the heat reservoir 30 decreases. Also, since no heat is stored in the heat reservoir 30, even when the exhaust gas and the heat reservoir 30 are brought into contact with each other, an increase in the temperature of the exhaust gas is not expected. Also, the heating member 31 is not energized. Notably, a second heating member 35 energized by the battery is provided at the discharge opening 20b. At the time of cold start, the second heating member 35 is energized to heat the exhaust gas.

In the case where the operation state of the vehicle is a steady operation state, as shown in FIG. 5, the flow passage changeover valve 25 is switched to establish communication between the introduction opening 20a and the first and second flow passage pipes 21 and 22 to thereby lead the exhaust gas from the engine 510 to the first and second flow passage pipes 21 and 22; i.e., the first and second flow passages 21a and 22a. This operation is performed for the following reason. At the time of steady operation, the temperature of the exhaust gas introduced into the exhaust gas temperature control apparatus increases to about 200° C. Therefore, it is possible to heat the heat reservoir 30, by exposing the heat reservoir 30 to the exhaust gas, to thereby cause the heat reservoir 30 to store heat. Neither the heating member 31 nor the second heating member 35 is energized.

In the case where the operation state of the vehicle is a deceleration or low load state, as shown in FIG. 6, the flow passage changeover valve 25 is switched to close the first flow passage pipe 21 and lead the exhaust gas from the engine 510 to the second flow passage pipe 22; i.e., the second flow passage 22a. As will be described later, at the time of deceleration, the vehicle according to the present embodiment can collect the kinetic energy at the time of deceleration as electrical energy through use of an alternator to thereby obtain regenerative electric power. In view of this, at the time of deceleration, the heating member 31 generates heat through use of the regenerative electric power to thereby store heat in the heat reservoir 30. Also, in the case where the load of the vehicle is low and the on-vehicle battery stores a surplus amount of electric power, the heating member 31 generates heat through use of the electric power of the on-vehicle battery to thereby store heat in the heat reservoir 30. One reason why the first flow passage pipe 21 is closed in either case is to prevent the exhaust gas from taking the heat generated by the heating member 31 or the heat stored in the heat reservoir 30 to thereby allow the heat reservoir 30 to store a larger amount of heat. Another reason why the first flow passage pipe 21 is closed is that at the time of deceleration from a steady operation state or at the time of transition to a low load state, NOx, HC, CO, etc. are hardly emitted, and it is unnecessary to heat the exhaust gas by the heating member 31 or the heat reservoir 30. Notably, the supply of electricity to the second heating member 35 is also not performed.

In the case where the operation state of the vehicle is an acceleration state and the heat reservoir 30 stores a sufficient amount of heat, as shown in FIG. 7, the flow passage changeover valve 25 is switched to close the second flow passage pipe 22 and lead the exhaust gas from the engine 510 to the first flow passage pipe 21; i.e., the first flow passage 21a. At the time of acceleration, the engine load increases, the amount of emitted NOx increases, and the flow rate of the exhaust gas itself increases. Therefore, if the exhaust gas is introduced directly into the SCR unit 14, the temperature of the SCR unit 14 may become lower than a temperature suitable for its operation. In view of this, in order to activate the SCR unit 14 to a sufficient degree, the exhaust gas is heated by the heat stored in the heat reservoir 30 so as to increase the temperature of the SCR unit 14 to the temperature suitable for its operation to thereby allow the SCR unit 14 to process NOx of an increased amount. Also, neither the heating member 31 nor the second heating member 35 is energized.

In the case where the operation state of the vehicle is the state of rapid acceleration or in the case where the operation state of the vehicle is an acceleration state and the heat reservoir 30 has not yet stored a sufficient amount of heat, as shown in FIG. 8, the flow passage changeover valve 25 is switched to close the second flow passage pipe 22 and lead the exhaust gas from the engine 510 to the first flow passage pipe 21; i.e., the first flow passage 21a. Also, the supply of electricity to the second heating member 35 is performed for the following reason. At the time of rapid acceleration, the engine load increases, the amount of emitted NOx increases, and the flow rate of the exhaust gas increases considerably. Therefore, the exhaust gas cannot be heated to a sufficient degree by only the heat stored in the heat reservoir 30. Therefore, the shortage of heat is supplemented by the heat generated by the second heating member 35. Another reason why the supply of electricity to the second heating member 35 is performed is as follows. In the case where the vehicle accelerates in a state in which the amount of heat stored in the heat reservoir 30 is not sufficient, the exhaust gas having increased in flow rate cannot be heated to a sufficient degree by only the heat stored in the heat reservoir 30. Therefore, the shortage of heat is supplemented by the heat generated by the second heating member 35. Notably, the heating member 31 is not energized. Also, in the case where the sum of the amount of heat generated as a result of energization of the second heating member 35 and the amount of heat stored in the heat reservoir 30 is less than the required amount of heat, in addition to the second heating member 35, the heating member 31 may be caused to generate heat through use of electric power other than the regenerative electric power; for example, through use of the electric power of the battery 42. Alternatively, only the heating member 31 may be caused to generate heat without causing the second heating member 35 to generate heat.

In the case where the operation state of the vehicle is a high load state or a state in which the DPF is regenerated, as shown in FIG. 9, the flow passage changeover valve 25 is switched to close the second flow passage pipe 22 and lead the exhaust gas from the engine 510 to the first flow passage pipe 21; i.e., the first flow passage 21a. At the time of high load or at the time of regeneration of the DPF, the temperature of the exhaust gas rises to about 400° C. within a short period of time and leakage of $NH_3$ tends to occur at the SCR unit 14. In view of this, the thermal energy of the exhaust gas having an excessively high temperature is absorbed by the heat reservoir 30 so as to decrease the rising speed of the temperature of the exhaust gas to thereby suppress the leakage of NH3. Notably, neither the heating member 31 nor the second heating member 35 is energized.

Figure 10:
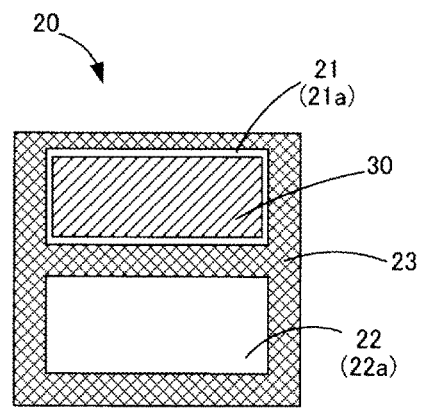
FIG. 10 is an explanatory view showing a modification of the exhaust gas temperature control apparatus according to the first embodiment.

Although the exhaust gas temperature control apparatus 20 according to the present embodiment shown in FIGS. 2 and 3 has the first flow passage pipe 21 and the second flow passage pipe 22 which are arranged in parallel in the horizontal direction, the exhaust gas temperature control apparatus 20 may have a first flow passage pipe 21 and a second flow passage pipe 22 which are arranged in parallel in the vertical direction as shown in FIG. 10. FIG. 10 is an explanatory view showing a modification of the exhaust gas temperature control apparatus according to the first embodiment. For example, in the case where a mounting space extending in the horizontal direction does not exist and a mounting space extending in the vertical direction can be found, the exhaust gas temperature control apparatus 20 according to the first embodiment can be mounted on the vehicle (in the mounting space extending in the vertical direction).

Figure 11:
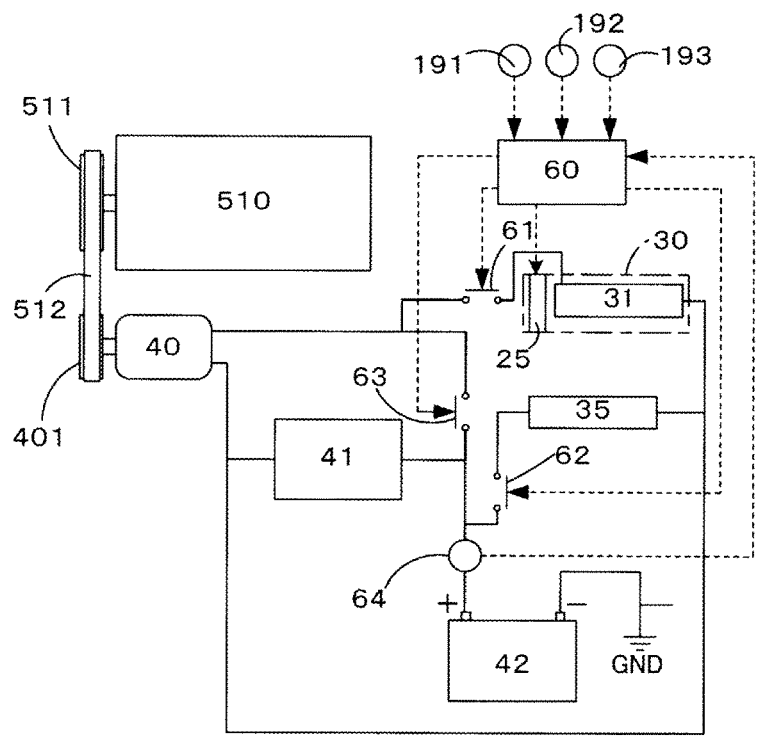
FIG. 11 is a block diagram schematically showing the electrical connections among electrical components in the vehicle having the heat reservoir according to the first embodiment.

FIG. 11 is a block diagram schematically showing the electrical connections among electrical components in the vehicle having the heat reservoir according to the first embodiment. The vehicle 500 includes an alternator (generator) 40 which is driven by the drive force of the engine 510. The engine 510 has an engine-side pulley 511 for providing to the alternator 40 the drive force (output) taken out from a crankshaft (not shown). The alternator 40 has an alternator-side pulley 401 for receiving the drive force provided from the engine 510. The engine-side pulley 511 and the alternator-side pulley 401 are mechanically connected by a belt 512, whereby the drive force of the engine 510 is transmitted to the alternator 40 through the belt 512.

The vehicle 500 includes the flow passage changeover valve 25, a vehicle accessory 41, the battery 42, a control unit 60, a first relay 61, a second relay 62, a third relay 63, the first temperature sensor 191, the second temperature sensor 192, and the third temperature sensor 193. The flow passage changeover valve 25, which has the above-described structure, is connected to the control unit 60 through a control signal line. The valve body of the flow passage changeover valve 25 is driven by its actuator in accordance with the control signal from the control unit 60, whereby the flow passage of the exhaust gas is switched to the first flow passage pipe 21, to the second flow passage pipe 22, or to the first and second flow passage pipes 21 and 22. The control unit 60 functions as a temperature control section for adjusting the temperature of the exhaust gas discharged from the exhaust gas temperature control apparatus 20.

The vehicle accessory 41 is an accessory which is used when the vehicle travels and which is driven by (consumes) the electric power output from the alternator 40 or the electric power stored in the battery 42. Examples of the vehicle accessory 41 include head lamps, an audio system, a navigation system, and an electric heater.

The output terminal of the alternator 40 is electrically connected to the heating member 31 through the first relay 61. Also, the output terminal of the alternator 40 is electrically connected to the vehicle accessory 41 through the third relay 63 and is electrically connected to the positive terminal (+) of the battery 42 through an ammeter 64. The positive terminal (+) of the battery 42 is electrically connected to the second heating member 35 through the second relay 62. Notably, a DC/DC converter for voltage step up or voltage step down may be disposed in a wiring path extending from the alternator 40 to the vehicle accessory 41 and the battery 42. The ground-side terminals of the alternator 40, the vehicle accessory 41, the heating member 31, and the second heating member 35 are electrically connected to the negative terminal (−) of the battery 42 through the body ground.

The first relay 61 is a switch which turns the heating member 31 on and off; namely, allows and stops the supply of electric power to the heating member 31. The second relay 62 is a switch which turns the second heating member 35 on and off; namely, allows and stops the supply of electric power to the second heating member 35. The third relay 63 is a switch which allows and stops the supply of electric power generated by the alternator 40 to the accessory 41 and the battery 42. The first to third relays 61 to 63 are connected to the control unit 60 through control signal lines and are turned on (closed) and turned off (opened) by the control signals from the control unit 60. The ammeter 64 detects the output current of the battery 42 and provides the detected output current to the control unit 60 through a signal line. The first temperature sensor 191, which is used to detect the temperature of the exhaust gas temperature control apparatus 20 (the heat reservoir 30), and the second temperature sensor 192, which is used to detect the temperature of the exhaust gas introduced into the exhaust gas temperature control apparatus 20, are both connected to the control unit 60 through signal lines.

In the present embodiment, the electric power generated by the alternator 40 can be supplied to the heating member 31 directly, namely, without storing the electric power in the battery 42, by turning the first relay 61 on and turning the third relay 63 off. For example, under the condition that the battery 42 is in a prescribed fully charged state at the time of deceleration of the vehicle and the electric power output from the alternator 40 becomes excessive power, it is possible to operate the alternator 40 so as to supply electric power to the heating member 31 for heat generation. The thermal energy generated by the heating member 31 is used to heat the heat reservoir 30, whereby heat is stored in the heat reservoir. As a result, it is possible to convert the kinetic energy of the vehicle to electrical energy and then to thermal energy, without wasting the kinetic energy, to thereby store the thermal energy in the heat reservoir 30. As having been already described, the heat stored in the heat reservoir 30 is used to increase the temperature of the exhaust gas in accordance with the operation state of the vehicle. Also, in the case where the operation state of the vehicle is a low load state and the battery 42 stores a surplus amount of electric power, the control unit 60 may turn on the first and third relays 61 and 63 to thereby cause the heating member 31 to generate heat using the electric power from the battery 42. The second heating member 35 generates heat using the electric power from the battery 42 when the second relay 62 is turned on.

Figure 12:
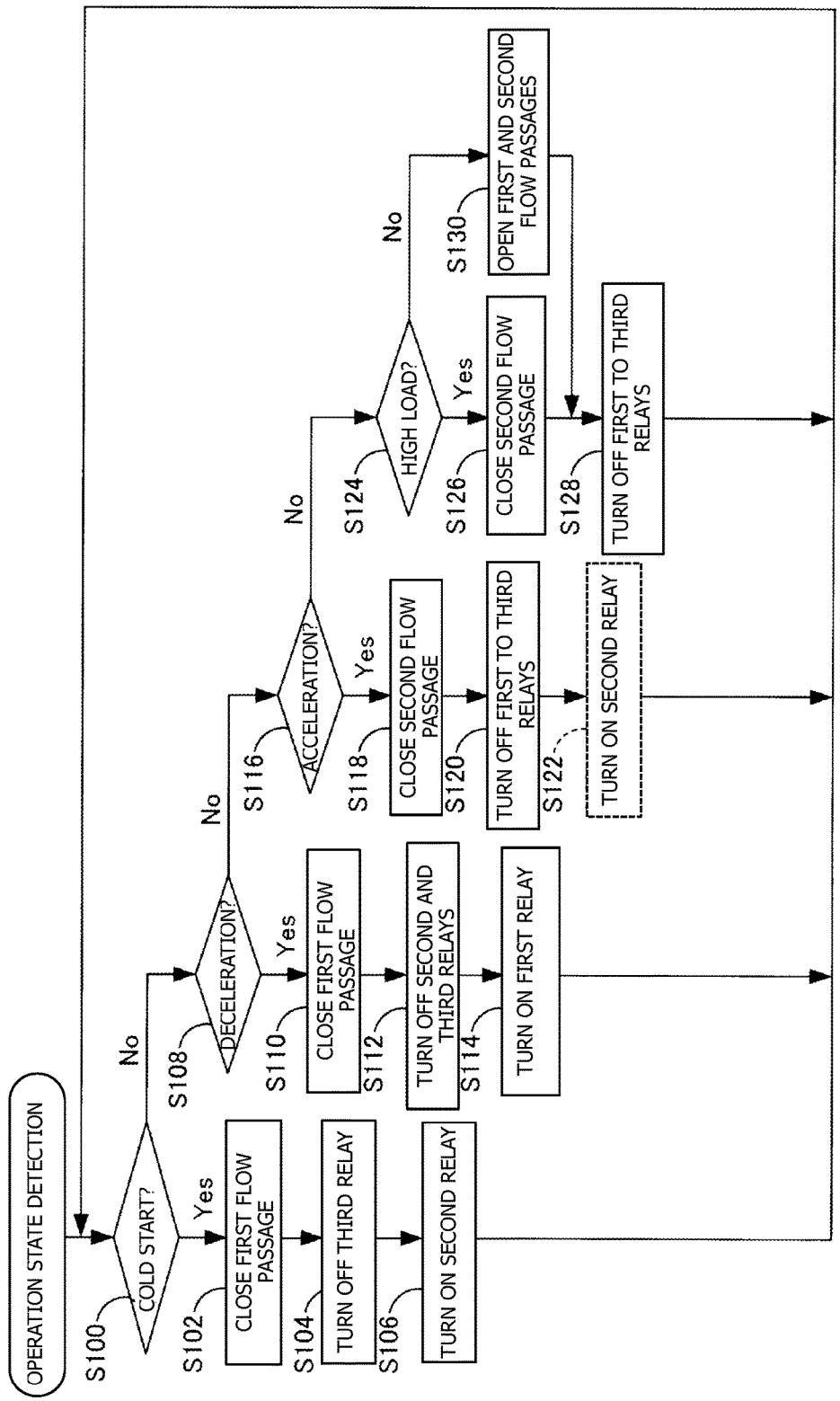
FIG. 12 is a flowchart showing a first processing routine for controlling the operation of the exhaust gas temperature control apparatus in the first embodiment.

Operation control for the exhaust gas temperature control apparatus 20 in the first embodiment will be described with reference to FIG. 12. FIG. 12 is a flowchart showing a first processing routine for controlling the operation of the exhaust gas temperature control apparatus in the first embodiment. The present processing routine is executed by the control unit 60. Notably, the control unit 60 includes at least a central processing unit (CPU), memories, and an input/output interface for exchanging control signals and detection signals with external devices. The CPU, the memories, and the input/output interface are not shown in the drawings.

The control unit 60 starts the present processing routine when the vehicle is started, and detects the operation state of the vehicle using various sensors provided on the vehicle. For example, the control unit 60 can judge the operation state of the vehicle (i.e., an acceleration state, a deceleration state, or a steady operation state) on the basis of an input signal input from an accelerator pedal opening sensor and an input signal input from the temperature sensor 192 disposed on the upstream side of the exhaust gas temperature control apparatus 20, judges whether or not DPF regeneration processing is being executed on the basis of a DPF control signal, and judges whether or not the engine is cold started on the basis of an input signal which is input from the third temperature sensor 193 and represents the coolant temperature.

The control unit 60 judges whether or not the operation state of the vehicle is a cold start state (step S100). In the case where the control unit 60 judges that the operation state of the vehicle is a cold start state (step S100: Yes), the control unit 60 sends a control signal to the flow passage changeover valve 25 so as to close the first flow passage pipe 21 (the first flow passage 21a) (step S102). Namely, as shown in FIG. 4, the control unit 60 establishes communication between the introduction opening 20a and the second flow passage pipe 22 (the second flow passage 22a) to thereby lead the exhaust gas to the second flow passage 22a. The control unit 60 judges whether or not the vehicle is in a cold start state on the basis of the coolant temperature input from the third temperature sensor 193 which detects the coolant temperature of the engine 510. For example, in the case where the coolant temperature detected by the third temperature sensor 193 is 0° C. to 20° C., the control unit 60 judges that the vehicle is in a cold start state. Alternatively, the control unit 60 may judge whether or not the vehicle is in a cold start state on the basis of the temperature of the exhaust gas introduced into the exhaust gas temperature control apparatus 20 detected by the second temperature sensor 192 (for example, the temperature of the exhaust gas is 50° C. or lower), or on the basis of the coolant temperature and the exhaust gas temperature. The control unit 60 turns off the third relay 63 (step S104), turns on the second relay (step S106), and returns to the detection of the operation state. As a result of switching of the third relay 63 to the off position, the heating member 31 is turned off (is disconnected from the electric power circuit), and as a result of switching of the second relay 62 to the on position, the second heating member 35 is turned on. As a result, the exhaust gas introduced into the exhaust gas temperature control apparatus 20 is heated to a higher temperature by the second heating member 35, whereby the temperature of the SCR unit 14 in the subsequent stage can be quickly raised to a proper operating temperature.

Notably, the control unit 60 may judge whether or not the third relay 63 is in the on position before sending an off signal (opening signal) to the third relay 63 and send the off signal to the third relay 63 only when the third relay 63 is in the on position, or the control unit 60 may send the off signal to the third relay 63 irrespective of the present position of the third relay 63. This procedure is the same in the valve position switching control for the flow passage changeover valve 25 and in the on-off control for the first and second relays 61 and 62.

In the case where the control unit 60 judges that the operation state of the vehicle is not a cold start state (step S100: No), the control unit 60 judges whether or not the operation state of the vehicle is a deceleration state (step S108). In the case where the control unit 60 judges that the operation state of the vehicle is a deceleration state (step S108: Yes), the control unit 60 sends a control signal to the flow passage changeover valve 25 so as to close the first flow passage pipe 21 (the first flow passage 21a) (step S110) and establish communication between the introduction opening 20a and the second flow passage pipe 22 (the second flow passage 22a) to thereby lead the exhaust gas to the second flow passage 22a as shown in FIG. 6. Namely, the control unit 60 prevents the heat reservoir 30 from being exposed to the flow of the exhaust gas to thereby efficiently execute the processing of storing heat in the heat reservoir 30 using the heating member 31 which will be described later. In the case where the input signal from the accelerator pedal opening sensor indicates that the accelerator pedal is not operated (the opening (the amount of operation of the pedal) is zero), the control unit 60 judges that the operation state of the vehicle is a deceleration state (coasting state). The control unit 60 turns off the second and third relays 62 and 63 (step S112), turns on the first relay 61 (step S114), and returns to the detection of the operation state. As a result of switching of the second and third relays 62 and 63 to the off position, the second heating member 35 is turned off (disconnected from the electric power circuit), and the connection between the battery 42 and the alternator 40 is broken. Meanwhile, as a result of the first relay 61 being turned on, the regenerative electric power generated by the alternator 40 as a result of deceleration is supplied to the heating member 31, and the heating member 31 generates heat which is stored in the heat reservoir 30.

Notably, in addition to the judgment as to whether or not the operation state of the vehicle is a deceleration state, the control unit 60 may judge whether or not the vehicle is in a low load state. In the case where the vehicle is in a low load state, the control unit 60 may switch the exhaust gas flow passage of the exhaust gas temperature control apparatus 20 in the same manner as in the case where the vehicle is in a deceleration state. The judgement as to whether or not the vehicle is in a low load state can be made by judging whether or not the opening of the accelerator pedal is less than a predetermined opening and the vehicle speed is approximately constant. In the case where the vehicle is in a low load state, since regenerative electric power cannot be obtained, the supply of electric power to the heating member 31 is performed through use of the electric power of the battery 42. Accordingly, the control unit 60 turns off the first and third relays 61 and 63 and turns on the second relay 62. The processing of storing heat in the heat reservoir 30 for the case where the vehicle is in a low load state is executed when a surplus amount of electric power remains in the battery 42 or the case where the battery 42 is in a state in which charging by the alternator 40 is unnecessary.

In the case where the control unit 60 judges that the operation state of the vehicle is not a deceleration state (step S108: No), the control unit 60 judges whether or not the operation state of the vehicle is an acceleration state (step S116). In the case where the control unit 60 judges that the operation state of the vehicle is an acceleration state (step S116: Yes), the control unit 60 sends a control signal to the flow passage changeover valve 25 so as to close the second flow passage pipe 22 (the second flow passage 22*a*) (step S118) and establish communication between the introduction opening 20*a* and the first flow passage pipe 21 (the first flow passage 21*a*) to thereby lead the exhaust gas to the first flow passage 21*a* as shown in FIG. 7. The control unit 60 judges that the operation state of the vehicle is an acceleration state when the opening of the accelerator pedal is equal to or greater than a predetermined angle and a change in vehicle speed per unit time is equal to or greater than a predetermined value. The control unit 60 turns off the first to third relays 61 to 63 (step S120) and returns to the detection of the operation state. As a result of switching of the first to third relays 61 to 63 to the off position, the heating member 31 and the second heating member 35 are turned off (disconnected from the electric power circuit), and the connection between the battery 42 and the alternator 40 is broken. Since the flow rate of the exhaust gas increases and the amount of NOx increases at the time of acceleration, by exposing the heat reservoir 30 to the exhaust gas, the exhaust gas is heated by the thermal energy stored in the heat reservoir 30, whereby the temperature of the exhaust gas discharged from the exhaust gas temperature control apparatus 20 is raised to a desired temperature. Notably, the desired temperature is a temperature within a temperature range within which the SCR unit 14 can operate properly.

Notably, in addition to the judgment as to whether or not the operation state of the vehicle is an acceleration state, the control unit 60 may judge whether or not the vehicle is in a rapid acceleration state. In the case where the vehicle is in a rapid acceleration state, as shown in FIG. 8, the control unit 60 may turn on the second relay 62 (step 122) so as to cause the second heating member 35 to generate heat using the electric power of the battery 42. In a rapid acceleration state, the flow rate of the exhaust gas increases considerably and the exhaust gas cannot be heated to the desired temperature by only the heat stored in the heat reservoir 30 in some cases. In view of this, the shortage of heat is supplemented by the heat generated by the second heating member 35. The judgment as to whether or not the vehicle is in a rapid acceleration state can be made by judging whether or not a kick-down switch which is turned on when the accelerator pedal is fully pressed down to the floor has been turned on. Also, in the case where the vehicle is in an acceleration state and the temperature of the heat reservoir 30 is lower than a predetermined temperature, heating of the exhaust gas by the second heating member 35 may be performed in the same manner as in the case where the vehicle is in a rapid acceleration state. In this case as well, the exhaust gas having a high flow speed in an acceleration state cannot be heated to a sufficiently high temperature in some cases. In such a case, heating by the second heating member 35 becomes necessary in order to heat the exhaust gas discharged from the exhaust gas temperature control apparatus 20 to the desired temperature. The temperature of the heat reservoir 30 can be detected by, for example, the first temperature sensor 191.

In the case where the control unit 60 judges that the operation state of the vehicle is not an acceleration state (step S116: No), the control unit 60 judges whether or not the operation state of the vehicle is a high load state (step S124). In the case where the control unit 60 judges that the operation state of the vehicle is a high load state (step S124: Yes), the control unit 60 sends a control signal to the flow passage changeover valve 25 so as to close the second flow passage pipe 22 (the second flow passage 22*a*) (step S126) and establish communication between the introduction opening 20*a* and the first flow passage pipe 21 (the first flow passage 21*a*) to thereby lead the exhaust gas to the first flow passage 21*a* as shown in FIG. 9. The control unit 60 can judge whether or not the vehicle is in a high load state on the basis of the opening of the accelerator pedal (by judging whether or not the opening is equal to or greater than a predetermined opening), fuel injection amount, traveling gear, and vehicle speed. Namely, in the case where the opening of the accelerator pedal is large and the vehicle speed is low, it can be said that the vehicle is in a high load state. The control unit 60 turns off the first to third relays 61 to 63 (step S128) and returns to the detection of the operation state. As a result of switching of the first to third relay 61 to 63 to the off position, the heating member 31 and the second heating member 35 are turned off (disconnected from the electric power circuit), and the connection between the battery 42 and the alternator 40 is broken. At the time of high load, the temperature of the exhaust gas increases. Therefore, a portion of the thermal energy of the exhaust gas is absorbed by the heat reservoir 30 as a result of exposure of the heat reservoir 30 to the exhaust gas, whereby the temperature of the exhaust gas introduced into the exhaust gas temperature control apparatus 20 is decreased to a desired temperature before the exhaust gas is discharged from the exhaust gas temperature control apparatus 20. Notably, the desired temperature is, for example, a temperature within a temperature range within which leakage of $NH_3$ does not occur at the SCR unit 14.

Notably, in addition to the judgment as to whether or not the operation state of the vehicle is a high load state, the control unit 60 may judge whether or not the vehicle is in a DPF regeneration processing state. In the case where the vehicle is in a DPF regeneration processing state, as shown in FIG. 9, the control unit 60 may turn off the first to third relays 61 to 63. In the DPF regeneration processing state, in order to regenerate the DPF catalyst, post injection is executed, and hydrocarbon originating from the fuel is supplied to the DPF 13. As a result, the hydrocarbon originating from the fuel is catalytically combusted at the DPF 13, whereby the exhaust gas temperature increases to 450° C. or higher, and the collected particulate matter is oxidized. Thus, forced regeneration is carried out. Since the DPF 13 is disposed on the upstream side of the exhaust gas temperature control apparatus 20, the temperature of the exhaust gas introduced into the exhaust gas temperature control apparatus 20 also increases greatly. In view of this, a portion of the thermal energy of the exhaust gas is absorbed by the heat reservoir 30, whereby the exhaust gas whose temperature has been decreased to a desired temperature is discharged from the exhaust gas temperature control apparatus 20.

In the case where the control unit 60 judges that the operation state of the vehicle is not a high load state (step S124: No), the control unit 60 judges that the operation state of the vehicle is a steady travel state and sends a control signal to the flow passage changeover valve 25 so as to open both of the first and second flow passage pipes 21 and 22 (the first flow passage 21a and the second flow passage 22a) (step S130) as shown in FIG. 5, and returns to the detection of the operation state. The expression "open both of the first and second flow passage pipes 21 and 22" means an operation of moving the valve body to the neutral position so that the introduction opening 20a communicates with the first flow passage pipe 21 (the first flow passage 21a) and the second flow passage pipe 22 (the second flow passage 22a) and the exhaust gas is led to the first and second flow passages 21a and 22a. In a steady travel state, the flow rate of the exhaust gas is smaller than that at the time of acceleration and the temperature of the exhaust gas is lower than that at the time of high load. Therefore, a portion of the exhaust gas is discharged directly from the exhaust gas temperature control apparatus 20 and the remaining portion of the exhaust gas is discharged from the exhaust gas temperature control apparatus 20 after being used for storing heat in the heat reservoir 30.

Figure 13:
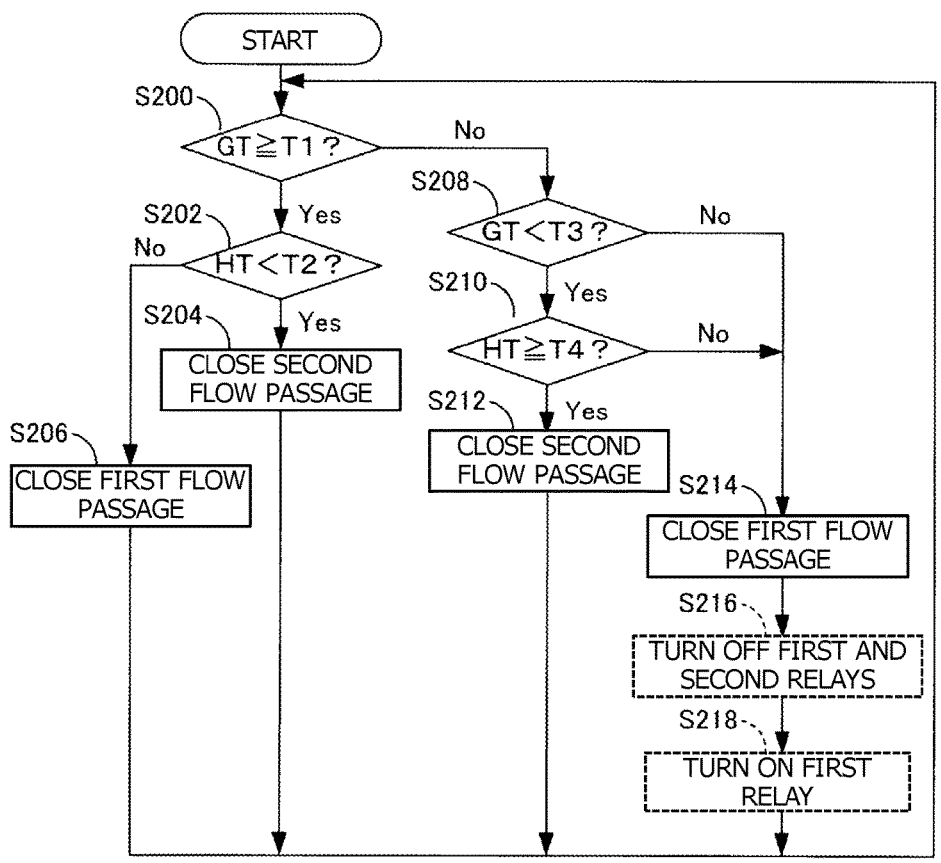
FIG. 13 is a flowchart showing a second processing routine for controlling the operation of the exhaust gas temperature control apparatus in the first embodiment.

Second operation control for the exhaust gas temperature control apparatus 20 will be described with reference to FIG. 13. FIG. 13 is a flowchart showing a second processing routine for controlling the operation of the exhaust gas temperature control apparatus in the first embodiment. In the first processing routine, the operation of the exhaust gas temperature control apparatus 20 is controlled on the basis of the operation state of the vehicle. In contrast, in the second processing routine, the operation of the exhaust gas temperature control apparatus 20 is controlled on the basis of the temperature of the exhaust gas and the temperature of the heat reservoir 30.

The control unit 60 judges whether or not the temperature GT of the exhaust gas introduced into the exhaust gas temperature control apparatus 20 is a first predetermined temperature T1 or higher (step S200). The exhaust gas temperature GT can be detected by the second temperature sensor 192. The first predetermined temperature T1 is the temperature of the exhaust gas at the time of high load or at the time of DPF regeneration processing, and is, for example, 400° C. In the case where the temperature GT of the exhaust gas GT is the first predetermined temperature T1 or higher, in consideration of leakage of $NH_3$ at the SCR unit 14 in the subsequent stage, it is desired that the temperature of the exhaust gas be lowered by the heat reservoir 30 as having been described already.

In the case where the control unit 60 judges that the exhaust gas temperature GT is equal to or higher than the first predetermined temperature T1 (step S200: Yes), the control unit 60 judges whether or not the temperature HT of the heat reservoir 30 is lower than a second predetermined temperature T2 (step S202). The heat reservoir temperature HT can be detected by the first temperature sensor 191. The second predetermined temperature T2 is a temperature which is lower than the first predetermined temperature T1 and at which the heat reservoir 30 does not raise the temperature of the introduced exhaust gas, and is, for example, a temperature which satisfies the relation of 300° C.<T2<400° C. In the case where the control unit 60 judges that the heat reservoir temperature HT is lower than the second predetermined temperature T2 (step S202: Yes), the control unit 60 sends a control signal to the flow passage changeover valve 25 so as to close the second flow passage pipe 22 (the second flow passage 22a) (step S204) and establish communication between the introduction opening 20a and the first flow passage pipe 21 (the first flow passage 21a) to thereby lead the exhaust gas to the first flow passage 21a as shown in FIG. 9. As a result, the exhaust gas temperature control apparatus 20 can discharge the high-temperature exhaust gas after decreasing its temperature to a predetermined temperature or without further heating the exhaust gas. After that, the control unit 60 returns to the detection of the operation state.

In the case where the control unit 60 judges that the heat reservoir temperature HT is equal to or higher than the second predetermined temperature T2 (step S202: No), the control unit 60 sends a control signal to the flow passage changeover valve 25 so as to close the first flow passage pipe 21 (the first flow passage 21a) (step S206) and establish communication between the introduction opening 20a and the second flow passage pipe 22 (the second flow passage 22a) to thereby lead the exhaust gas to the second flow passage 22a. After that, the control unit 60 returns to the detection of the operation state. In the case where the temperature HT of the heat reservoir 30 is equal to or higher than the second predetermined temperature T2, it is not expected that the heat reservoir 30 lowers the temperature of the exhaust gas to a sufficient degree. Also, in the case where the temperature HT of the heat reservoir 30 is equal to or higher than 400° C., the heat reservoir 30 further raises the temperature of the exhaust gas. For these reasons, the exhaust gas is discharged from the exhaust gas temperature control apparatus 20 without being exposed to the heat reservoir 30.

In the case where the control unit 60 judges that the exhaust gas temperature GT is lower than T1 (step S200: No), the control unit 60 judges whether or not the exhaust gas temperature GT is lower than a third predetermined temperature T3 (step S208). The third predetermined temperature T3 is a temperature which is lower than the first predetermined temperature T1 and which is not sufficiently high for activation of the SCR unit 14 in the subsequent stage, and is, for example, 100° C. In the case where the control unit 60 judges that the exhaust gas temperature GT is lower than the third predetermined temperature T3 (step S208: Yes), the control unit 60 judges whether or not the heat reservoir temperature HT is a fourth predetermined temperature T4 or higher (step S210). The fourth predetermined temperature T4 is a temperature which is higher than the second predetermined temperature T2 and the third predetermined temperature T3 and at which the SCR unit 14 in the subsequent stage can be activated, and is, for example, 200° C. In the case where the control unit 60 judges that the heat reservoir temperature HT is equal to or higher than the fourth predetermined temperature T4 (step S210: Yes), the control unit 60 sends a control signal to the flow passage changeover valve 25 so as to close the second flow passage pipe 22 (the second flow passage 22a) (step S212) and establish communication between the introduction opening 20a and the first flow passage pipe 21 (the first flow passage 21a) to thereby lead the exhaust gas to the first flow passage 21a. As a result, the exhaust gas introduced into the exhaust gas temperature control apparatus 20 is heated by the heat reservoir 30 having a higher temperature, whereby exhaust gas whose temperature is equal to or close to the desired temperature can be discharged. After that, the control unit 60 returns to the detection of the operation state.

In the case where the control unit 60 judges that the exhaust gas temperature GT is equal to or higher than the third predetermined third temperature T3 (step S208: No) or the case where the control unit 60 judges that the heat reservoir temperature HT is lower than the fourth predetermined third temperature T4 (step S210: No), the control unit 60 sends a control signal to the flow passage changeover valve 25 so as to close the first flow passage pipe 21 (the first flow passage 21a) (step S214) and establish communication between the introduction opening 20a and the second flow passage pipe 22 (the second flow passage 22a) to thereby lead the exhaust gas to the second flow passage 22a. As a result, the exhaust gas introduced into the exhaust gas temperature control apparatus 20 is discharged from the exhaust gas temperature control apparatus 20 without through the heat reservoir 30, so that the discharged exhaust gas has a temperature which is sufficiently high for operation of the SCR unit 14. Notably, in the case where steps S216 and S218 to be described later are not executed, communication may be established between the introduction opening 20a and the first and second flow passage pipes 21 and 22 (the first and second flow passages 21a and 22a) so as to lead the exhaust gas to the first and second flow passages 21a and 22a. In this case, exhaust gas whose temperature is sufficiently high for operation of the SCR unit 14 is discharged through the second flow passage 22a, and exhaust gas flowing through the first flow passage 21a allows the heat reservoir 30 to store heat.

The control unit 60 turns off the second and third relays 62 and 63 (step S216), turns on the first relay (step S218), and returns to the detection of the operation state. It is desired that the steps S216 and S218 be executed when regenerative electric power is obtained in some operation states of the vehicle. However, the steps S216 and S218 may be executed in the case where the electric power from the battery 42 is used if the amount of the electric power remaining in the battery 42 is sufficiently large.

As a result of the second and third relays 62 and 63 being turned off and the first relay 61 being turned on, in the case where the vehicle is in a deceleration state, the regenerative electric power generated by the alternator 40 is supplied to the heating member 31, whereby the heating member 31 generates heat. As a result, the heat reservoir 30 is heated by the heating member 31 and can store heat for heating the exhaust gas when the step S204 is executed next time.

According to the above-described exhaust gas temperature control apparatus 20 of the first embodiment, the thermal energy of the exhaust gas is stored by the heat reservoir 30, and the temperature of the exhaust gas is increased by the heat stored in the heat reservoir 30, whereby the temperature of the exhaust gas supplied to the exhaust gas purification unit can be controlled to a desired temperature range or to a desired temperature. In the case where an electrical heating member is used to heat the exhaust gas, a certain start-up time is needed. In contrast, in the case where the heat stored in the heat reservoir 30 is used to heat the exhaust gas, the temperature of the exhaust gas can be raised within a short period of time without needing such a start-up time. Also, since the heating member 31 is embedded in the heat reservoir 30 or disposed near the heat reservoir 30, heat can be stored in the heat reservoir 30 without depending the exhaust gas only. Further, since regenerative electric power obtained during deceleration of the vehicle is supplied to the heating member 31, it is unnecessary to additionally operate the internal combustion engine 510 (consume fuel) in order to obtain electric power for causing the heating member 31 to generate heat, and kinetic energy released during declaration can be converted to electrical energy used for causing the heating member 31 to generate heat.

Also, in the case where the temperature of the exhaust gas is relatively high, the temperature of the exhaust gas can be lowered by exposing the heat reservoir 30 to the exhaust gas, whereby problems occurring when exhaust gas of high temperature is supplied to the exhaust gas purification unit provided in the subsequent stage; for example, leakage of $NH_3$ at the SCR unit 14, can be suppressed or prevented.

As described above, the exhaust gas temperature control apparatus 20 according to the first embodiment can adjust the temperature of the exhaust gas to the operating temperature range of the purification unit, irrespective of the temperature of the exhaust gas discharged from the engine 510, without lowering the overall energy efficiency of the vehicle. As a result, the exhaust gas temperature control apparatus 20 can purify the exhaust gas to a desired level irrespective of the operation state of the vehicle.

B. Second Embodiment

Figure 14:
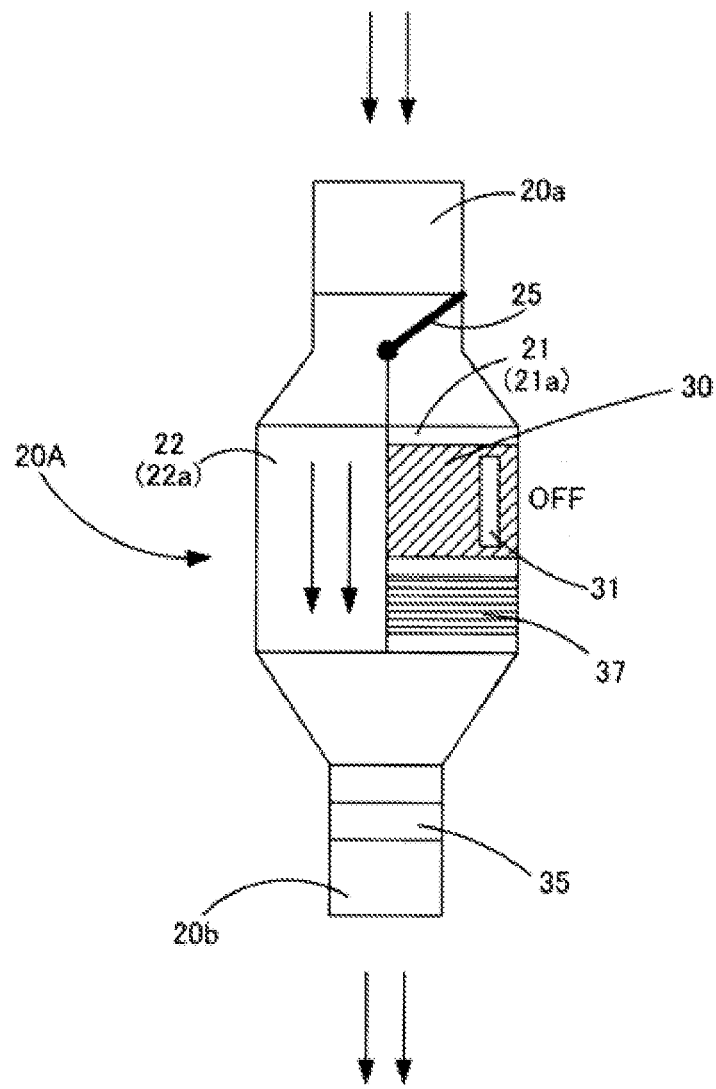
FIG. 14 is an explanatory view showing an operating state of an exhaust gas temperature control apparatus according to a second embodiment at the time of cold start.
Figure 15:
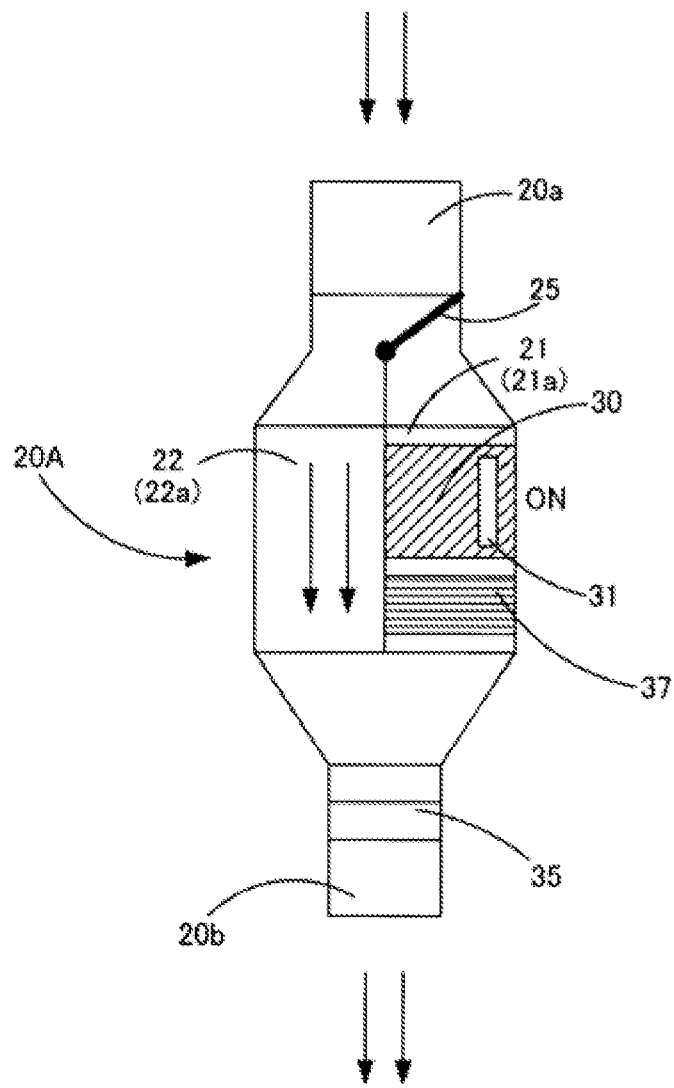
FIG. 15 is an explanatory view showing an operating state of the exhaust gas temperature control apparatus according to the second embodiment at the time of deceleration and at the time of low load.
Figure 16:
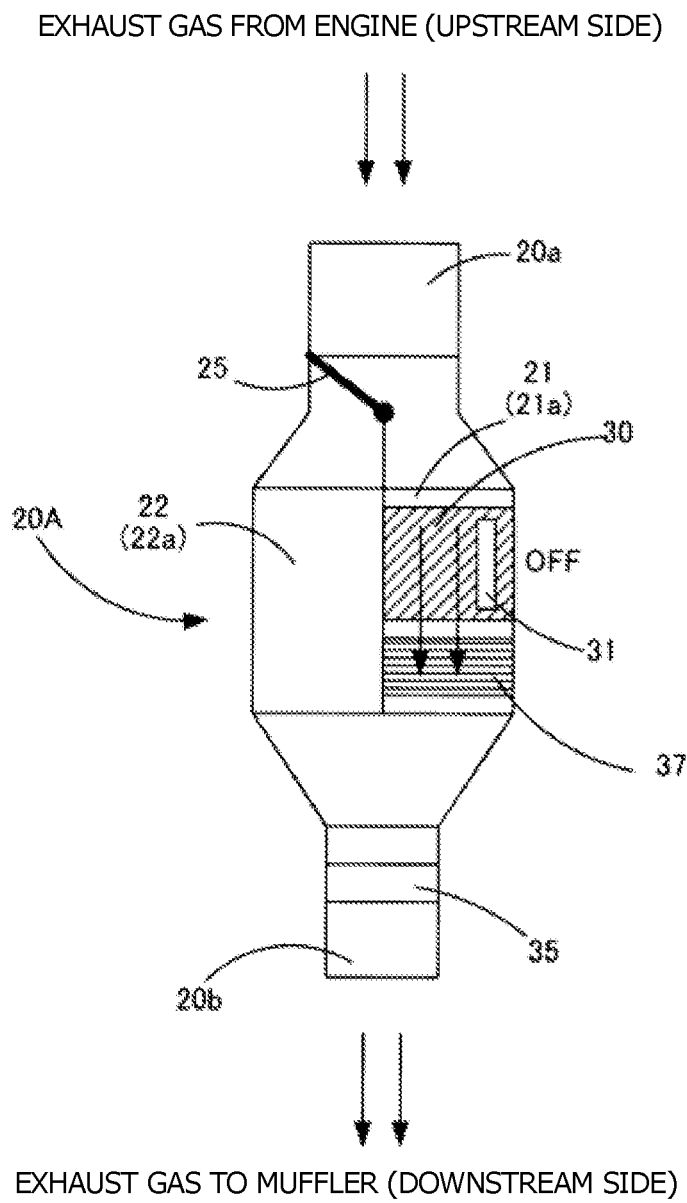
FIG. 16 is an explanatory view showing an operating state of the exhaust gas temperature control apparatus according to the second embodiment at the time of acceleration.

An exhaust gas temperature control apparatus 20A according to a second embodiment will be described with reference to FIGS. 14 to 16. More specifically, the switching of the flow passage changeover valve 25 in accordance with the operation state of the vehicle and the heating of the heat reservoir 30 by the heating member 31 will be described. FIG. 14 is an explanatory view showing an operating state of the exhaust gas temperature control apparatus according to the second embodiment at the time of cold start. FIG. 15 is an explanatory view showing an operating state of the exhaust gas temperature control apparatus according to the second embodiment at the time of deceleration and at the time of low load. FIG. 16 is an explanatory view showing an operating state of the exhaust gas temperature control apparatus according to the second embodiment at the time of acceleration.

The exhaust gas temperature control apparatus 20A according to the second embodiment differs from the exhaust gas temperature control apparatus 20 according to the first embodiment in the point that a pre SCR 37 is provided immediately after the heat reservoir 30. Namely, in addition to the heat reservoir 30 including the heating member 31, the pre SCR 37 is provided in the first flow passage pipe 21. Namely, in addition to the SCR unit 14 provided in the stage subsequent to the exhaust gas temperature control apparatus 20A, an SCR is separately provided in the exhaust gas temperature control apparatus 20A.

At the time of cold start shown in FIG. 14, the flow passage changeover valve 25 is switched so as to close the first flow passage pipe 21 and lead the exhaust gas from the engine 510 to the second flow passage 22a. Also, the electric power from the battery 42 is supplied to the second heating member 35, whereby the exhaust gas is heated. At the time of deceleration and low load shown in FIG. 15, the flow passage changeover valve 25 is switched so as to close the first flow passage pipe 21 and lead the exhaust gas from the engine 510 to the second flow passage 22a. The first relay 61 is turned on, whereby regenerative electric power generated as a result of deceleration is supplied to the heating member 31. As a result, the heating member 31 generates heat, and the generated heat is stored in the heat reservoir 30. Also, in the case where the load is low and the on-vehicle battery stores a surplus amount of electric power, the heating member 31 generates heat using the electric power of the on-vehicle battery and causes the heat reservoir 30 to store the generated heat.

At the time of acceleration shown in FIG. 16, the flow passage changeover valve 25 is switched so as to close the second flow passage pipe 22 and lead the exhaust gas from the engine 510 to the first flow passage 21a. Also, neither the heating member 31 nor the second heating member 35 is energized. At the time of acceleration, the amount of emitted NOx increases, and the flow rate of the exhaust gas itself increases. In the second embodiment, in addition to the heat reservoir 30 for heating the exhaust gas, and the pre SCR 37 is disposed immediately after the heat reservoir 30. Thus, by the heat stored in the heat reservoir 30, the temperature of the pre SCR 37 can be efficiently increased to a temperature necessary for thermal decomposition of urea water and hydrolyzing reaction. As a result, ammonia ($NH_3$) is produced smoothly, whereby conversion of the NOx component of the exhaust gas to nitrogen ($N_2$) and water ($H_2O$) can be performed sufficiently. Notably, the NOx component which has not been converted to nitrogen ($N_2$) and water ($H_2O$) by the pre SCR 37 can be converted to nitrogen and water at the SCR unit 14 in the subsequent stage. Notably, in the second embodiment, the second heating member 35 can be operated in the same manner as in the first embodiment.

According to the above-described exhaust gas temperature control apparatus 20A of the second embodiment, in addition to the SCR unit 14, the pre SCR 37 is provided in the exhaust gas temperature control apparatus 20A. Therefore, the temperature of the pre SCR 37 can be efficiently raised by the heat stored in the heat reservoir, whereby the ratio of conversion (decomposition) of the NOx component of the exhaust gas can be increased. Namely, slipping off of the NOx component due to a failure of the pre SCR 37 to reach its operating temperature can be suppressed or prevented. As a result, the pre SCR 37 can enhance the NOx component purifying performance in cooperation with the SCR unit 14 in the subsequent stage.

C. Modifications (1) In the above-described embodiments, the temperature of the heat reservoir 30 and the temperature of the exhaust gas are obtained by the first temperature sensor 191 provided on the heat reservoir 30 and the second temperature sensor 192 provided upstream of the heat reservoir 30. However, these temperatures may be equally obtained on the basis of the time elapsed after the startup of the engine 510 or on the basis of the record of energization of the heating member 31.

(2) Since each of the exhaust gas temperature control apparatuses 20 and 20A according to the above-described embodiments is provided upstream of the SCR unit 14, exhaust gas having a temperature suitable for NOx purification can be steadily supplied to the SCR unit 14. As a result, at the SCR unit 14, NOx purification can be performed under a condition under which NOx purification cannot be conventionally performed due to a decrease in the temperature of the exhaust gas, whereby the amount of NOx emitted to the atmosphere can be reduced further. Also, the processing of raising the exhaust gas temperature by fuel combustion, which has been conventionally performed at the DOC 12 or the DPF 13 in order to raise the exhaust gas temperature, becomes unnecessary, whereby the amount of fuel consumed independently of travel can be reduced.

(3) The exhaust gas temperature control apparatuses 20 and 20A according to the above-described embodiments may employ the following configuration instead of the above-described configuration. Each of the exhaust gas temperature control apparatuses 20 and 20A according to the above-described embodiments is disposed between the DPF 13 and the SCR unit 14. However, the exhaust gas temperature control apparatus 20 or 20A may be disposed upstream of the DPF 13. In this case, the temperature of the exhaust gas introduced into the DPF 13 can be maintained at a high temperature, and it is expected that spontaneous regeneration is performed periodically without performance of forced regeneration involving fuel injection. As a result, no fuel is consumed for the regeneration, whereby the fuel efficiency of the vehicle can be improved.

Notably, the term "purification unit" used in the present specification encompasses not only a so-called chemical-reaction-type purification catalyst which converts a particular component (substance) contained in exhaust gas to a harmless component (substance) using a catalyst, but also a filter-type purification unit which traps the particular component contained in exhaust gas. Even a filer-type purification unit may have a proper temperature range for properly performing its regeneration operation. Since the exhaust gas temperature control apparatuses 20 and 20A according to the above-described embodiments can maintain the temperature of the exhaust gas introduced into the filter-type purification unit to fall within the proper temperature range, the filter-type purification unit can exhibit expected performance under a wide range of conditions irrespective of the operation state of the engine 510. Accordingly, the exhaust gas temperature control apparatuses 20 and 20A according to the above-described embodiments may be disposed upstream of any purification unit so long as the purification unit exhibits expected performance as a result of introduction of exhaust gas within a predetermined temperature range, and as a result of being disposed upstream of such a purification unit, the exhaust gas temperature control apparatuses 20 and 20A allow the purification unit to exhibit its performance under a wide range of conditions.

(4) In the above-described embodiments, descriptions have been given by taking the diesel engine 510 as an example. However, each of the exhaust gas temperature control apparatuses 20 and 20A according to the above-described embodiments may be disposed in an exhaust gas passage of a gasoline engine and constitute an exhaust gas purification system for the gasoline engine. Although the temperature of exhaust gas discharged from a gasoline engine is higher than the temperature of exhaust gas discharged from a diesel engine, in order to purify the exhaust gas to a sufficient degree from the beginning of the startup of the engine, various attempts have been made to increase the temperature of a catalyst to a temperature range within which the catalyst exhibits an expected performance. For example, an attempt has been made to quickly warm up a three-way catalyst, generally used as a purification unit for a gasoline engine, by disposing the catalyst immediately after the exhaust manifold of the engine. However, in the case where the position of the catalyst is determined on the basis of the distribution of the exhaust gas temperature, the position of the catalyst cannot be determined freely, and the layout around the engine cannot be designed freely. In contrast, in the case where the exhaust gas temperature control apparatuses 20 and 20A according to the above-described embodiments are applied, quick warming up can be realized irrespective of the position of the three-way catalyst, and the degree of freedom of vehicle design can be increased.

(5) In the above-described embodiments, a single heat reservoir 30 is used. However, the heat reservoir 30 may be composed of a plurality of independent heat reservoirs. In this case, it is expected that the temperature distribution of exhaust gas within the heat reservoir 30 becomes uniform as a result of dispersion and mixing of exhaust gas temperatures among the heat reservoirs 30.

(6) In the above-described embodiments, each of the exhaust gas temperature control apparatuses 20 and 20A has the shape of a rectangular box. However, each of them may have a redundant shape which has a plurality of folds between the introduction opening 20a and the discharge opening 20b, or may have a cylindrical shape. Also, in the above-described embodiments, the exhaust gas temperature control apparatus 20 (20A) extends straight. However, the exhaust gas temperature control apparatus 20 (20A) may be applied to a purification system in which a portion of the structure or pipe is disposed to extend in a direction intersecting with the remaining portion of the structure or pipe and which is formed into a folded shape. For example, the exhaust gas temperature control apparatus 20 (20A) may be applied to a purification system which has a folded shape and which includes a parallel portion which becomes parallel to the ground surface when the system is mounted on a vehicle and an intersecting portion which intersects with the parallel portion, whereby the length in the flow direction of exhaust gas is shortened. Notably, the purification system may be a purification system in which the intersecting portion is a vertical portion perpendicular to the ground surface and which has a larger size in the vertical direction. In this case, the exhaust gas temperature control apparatus 20 (20A) may be disposed in the parallel portion or the intersecting portion.

Although the present invention has been described on the basis of embodiments and modifications thereof, the above-described embodiments of the invention are provided so as to facilitate understanding of the present invention and do not limit the present invention. The present invention can be modified or improved without departing from the spirit of the invention and the scopes of the claims, and the present invention encompasses equivalents thereof. For example, in order to solve, partially or entirely, the above-mentioned problem or yield, partially or entirely, the above-mentioned effects, technical features of the embodiments and modifications corresponding to technical features of the modes described in the section "Summary of the Invention" can be replaced or combined as appropriate. Also, the technical feature(s) may be eliminated as appropriate unless the present specification mentions that the technical feature(s) is essential.

DESCRIPTION OF REFERENCE NUMERALS

10: purification system
11: exhaust pipe
11a: manifold
11b: muffler end pipe
12: diesel oxidation catalyst
13: diesel particulate filter
14: selective catalytic reduction unit
15: diesel oxidation catalyst
17: fuel injection unit
18: urea water injection unit
191: first temperature sensor
192: second temperature sensor
193: third temperature sensor
20: exhaust gas temperature control apparatus
20A: exhaust gas temperature control apparatus
20a: introduction opening
20b: discharge opening
201: casing
21: first flow passage pipe
21a: first flow passage
22: second flow passage pipe
22a: second flow passage
23: heat insulating material
25: flow passage changeover valve
30: heat reservoir
31: heating member
35: second heating member
40: alternator
401: alternator-side pulley
41: accessory
42: battery
500: vehicle
510: diesel engine
511: engine-side pulley
512: belt
520: wheel
60: control unit
61: first relay
62: second relay
63: third relay
64: ammeter
T1: first predetermined temperature
T2: second predetermined temperature
T3: third predetermined temperature
T4: fourth predetermined temperature

What is claimed is:

1. An exhaust gas temperature control apparatus which adjusts the temperature of exhaust gas in a stage before an exhaust gas purification unit disposed in an exhaust pipe passage of an internal combustion engine, the exhaust gas temperature control apparatus comprising:

a heat reservoir configured to store and radiate heat;
a heater in heat-conductive contact with the heat reservoir and configured to cause the heat reservoir to store heat;
a temperature controller configured to cause the heat reservoir to store heat or radiate heat in accordance with an operation state of a vehicle on which the internal combustion engine is mounted in order to control the temperature of exhaust gas discharged from the exhaust gas temperature control apparatus;
a first flow passage for the exhaust gas, the first flow passage containing the heat reservoir;
a second flow passage for the exhaust gas which differs from the first flow passage; and
a changeover section which leads the exhaust gas to at least one of the first flow passage and the second flow passage, wherein,
the operation state of the vehicle is at least one of a cold start state, a deceleration state, an acceleration state, a high load state, a low load state, and a steady operation state,
the temperature controller causes the heat reservoir to store heat or radiate heat by controlling the changeover section, and
the temperature controller switches the changeover section to lead the exhaust gas to the second flow passage when the temperature of the exhaust gas is lower than a first predetermined temperature and is equal to or higher than a third predetermined temperature lower than the first predetermined temperature.

2. The exhaust gas temperature control apparatus according to claim 1, wherein the heater generates heat using regenerative electric power, the regenerative electric power obtained depending on the operation state of the vehicle.

3. The exhaust gas temperature control apparatus according to claim 1, wherein the temperature controller switches the changeover section to lead the exhaust gas to the first flow passage when either: (1) the temperature of the exhaust gas is equal to or higher than the first predetermined temperature and the temperature of the heat reservoir is lower than a second predetermined temperature lower than the first predetermined temperature, or (2) when the temperature of the exhaust gas is lower than the third predetermined temperature lower than the first predetermined temperature and the temperature of the heat reservoir is equal to or higher than a fourth predetermined temperature higher than the second predetermined temperature and the third predetermined temperature.

4. The exhaust gas temperature control apparatus according to claim 1, wherein, when the operation state of the vehicle is the deceleration state, the cold start state, or the steady operation state, the temperature controller switches the changeover section to lead the exhaust gas to the second flow passage.

5. The exhaust gas temperature control apparatus according to claim 4, wherein, when the operation state of the vehicle is the deceleration state, the temperature controller supplies obtained regenerative electric power to the heater.

6. The exhaust gas temperature control apparatus according claim 1, wherein, when the operation state of the vehicle is the acceleration state or is the high load state in which a load greater than a predetermined load acts on the vehicle, the temperature controller switches the changeover section to lead the exhaust gas to the first flow passage.

7. An exhaust gas temperature adjustment apparatus disposed in an exhaust pipe passage of an internal combustion engine, the exhaust gas temperature adjustment apparatus comprising:
    an introduction opening for introducing exhaust gas from the internal combustion engine;
    a discharge opening for discharging the introduced exhaust gas;
    a first flow passage establishing communication between the introduction opening and the discharge opening;
    a heat reservoir and a first electric heater disposed in the first flow passage, the heater in heat-conductive contact with the heat reservoir;
    a second flow passage which differs from the first flow passage, the second flow passage establishing communication between the introduction opening and the discharge opening;
    a changeover section configured to lead the exhaust gas to at least one of the first flow passage and the second flow passage in order to control the temperature of exhaust gas discharged from the exhaust gas temperature control apparatus; and
    a second electric heater disposed at the discharge opening.

8. The exhaust gas temperature adjustment apparatus according to claim 7, wherein the first electric heater and the heat reservoir are integrally formed.

9. The exhaust gas temperature adjustment apparatus according to claim 7, further comprising a selective catalytic reduction unit disposed in the first flow passage and located downstream of the heat reservoir and the first electric heater.

* * * * *